(12) United States Patent
Charbonneau et al.

(10) Patent No.: US 8,837,616 B2
(45) Date of Patent: Sep. 16, 2014

(54) EQUALIZATION OF A DISTRIBUTED PILOT OFDM SIGNAL

(75) Inventors: Terrance W. Charbonneau, Fort Wayne, IN (US); John P. Johnston, Fort Wayne, IN (US); Bruce E. Reidenbach, Albion, IN (US); Gregory T. Barnett, Fort Wayne, IN (US)

(73) Assignee: Exelis Inc., McLean, VA (US)

( * ) Notice: Subject to any disclaimer, the term of this patent is extended or adjusted under 35 U.S.C. 154(b) by 0 days.

(21) Appl. No.: 13/562,724

(22) Filed: Jul. 31, 2012

(65) Prior Publication Data

US 2014/0036984 A1    Feb. 6, 2014

(51) Int. Cl.
*H04K 1/10* (2006.01)

(52) U.S. Cl.
USPC ............................ 375/260; 341/180; 370/464

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | | |
|---|---|---|---|---|
| 7,339,882 | B2 * | 3/2008 | Schaefer et al. | 370/203 |
| 2006/0028976 | A1 | 2/2006 | Park et al. | |
| 2009/0060075 | A1 * | 3/2009 | Mohebbi | 375/260 |
| 2010/0266065 | A1 * | 10/2010 | Yokomakura et al. | 375/285 |
| 2010/0311343 | A1 * | 12/2010 | Keerthi | 455/63.1 |

OTHER PUBLICATIONS

Non-Published, co-pending U.S. Appl. No. 13/314,651, filed Dec. 8, 2011.
Non-Published, co-pending U.S. Appl. No. 13/362,794, filed Jan. 31, 2012.
Non-Published, co-pending U.S. Appl. No. 13/314,695, filed Dec. 8, 2011.

* cited by examiner

*Primary Examiner* — Adolf Dsouza
(74) *Attorney, Agent, or Firm* — Edell, Shapiro & Finnan, LLC

(57) ABSTRACT

A technique for equalizing a distributed pilot OFDM signal with decision feedback involves correlating a received OFDM signal against a pilot reference to obtain a coarse channel estimate, where the received OFDM signal includes a distributed pilot signal and an OFDM data signal. The received OFDM signal is equalized based on the coarse channel estimate and the distributed pilot signal is removed to generate a coarse data signal estimate. The coarse data signal estimate is removed from the received OFDM signal using the coarse channel estimate to generate a residual pilot signal. The residual pilot signal can then be correlated against the pilot reference to obtain a fine channel estimate. The received OFDM signal is equalized based on the fine channel estimate, and the distributed pilot signal is removed to produce a fine data signal estimate from which data is recoverable.

20 Claims, 19 Drawing Sheets

EQUALIZATION OF A DISTRIBUTED PILOT OFDM SIGNAL

BACKGROUND

Orthogonal Frequency Division Multiplexed (OFDM) transmission schemes are widely used in digital communications, including wireless networking (e.g., OFDM is used in the IEEE 802.11 wireless local area networking standards), television and audio broadcasting, and internet access. In an OFDM scheme, the overall system bandwidth is partitioned into a number of orthogonal subcarrier frequencies, commonly referred to as tones. A stream of informational bits is converted to a series of frequency-domain symbols, and these symbols are transmitted over the subcarrier frequencies. Each subcarrier is modulated with a modulation scheme, such as quadrature amplitude modulation (QAM) or some form of phase-shift keying (PSK).

Many techniques have been proposed to transmit pilot signals along with OFDM signals to allow receivers to estimate channel characteristics. One option is to add a distributed pilot channel probe to OFDM data being transmitted. In this approach, the transmitted sequences that constitute the data-bearing OFDM signal and the distributed pilot are conveyed through the transmission channel and typically arrive at the receiver perturbed by multipath effects and Additive White Gaussian Noise (AWGN). The receiver must equalize this received signal before demodulation to counteract the effects of channel multipath.

Minimum mean square error (MMSE) channel estimation techniques have been developed that require extensive matrix manipulations and perfect knowledge of both cross- and auto-covariances. Least-square (LS) channel estimation techniques avoid the requirement for perfect covariance knowledge, instead relying upon non-linear iterative techniques such as least mean square (LMS) and recursive least squares (RLS) to converge upon solutions. Accordingly, there remains a need for a simplified channel estimation solution that allows recovery of the data-bearing OFDM signal by taking advantage of the characteristics of a distributed pilot signal to accurately estimate the transmission channel.

SUMMARY

Described herein is a technique for equalizing a distributed pilot OFDM signal using decision feedback. A received OFDM signal includes a distributed pilot signal and an OFDM data signal. Initially, the entire received OFDM signal, including both the pilot signal and the data signal, is correlated against a pilot reference to obtain an initial channel estimate. In this operation, the distributed pilot signal within the received OFDM signal is the signal of interest while the data signal acts merely as interference, causing this initial channel estimate to be relatively coarse.

A zero forcing function is constructed from the coarse channel estimate and applied to the received OFDM signal in the frequency domain to equalize the received OFDM signal. After coarse equalization, the distributed pilot signal is removed, leaving essentially an imperfectly equalized data signal estimate along with the AWGN introduced in the transmission channel. Nevertheless, this remaining signal is sufficient to perform data recovery, resulting in a fairly accurate, noise-free coarse data signal estimate.

A more accurate (fewer bit errors) data signal estimate can be recovered by repeating the pilot correlation process with the received distributed pilot signal that is largely free of the interfering data signal. This operation can be accomplished by removing the coarse data signal estimate from the received OFDM signal using the coarse channel estimate, leaving essentially the pilot signal and AWGN. This residual pilot signal can be correlated against the pilot reference to obtain a more accurate "fine" channel estimate. The received OFDM signal can then be equalized again with a zero forcing function constructed from the fine channel estimate. After removing the distributed pilot signal from the equalized signal, data can more accurately be recovered from the resulting fine data signal estimate.

The coarse and fine channel estimates attempt to characterize multipath interference in the transmission channel by identifying the timing, amplitude and phase of peaks in the pilot correlation signal, which information can be used to equalize the received signal. According to another aspect of the described technique, a more accurate channel estimate can be achieved by performing interpolation using each peak sample and its adjacent samples to estimate the respective timings of the "true" correlation peaks. For each peak in the correlation signal (each detected signal path), the computed true peak timing can be used to select one branch filter from among the set of branch filters that constitute a polyphase interpolator, where the selected branch filter provides a fractional delay having a minimal timing offset error relative to the timing of the true peak (i.e., the "closest" branch filter is selected for each peak in the correlator output signal).

A modified correlation signal can be constructed from scaled replicas of filter coefficients of the selected polyphase filter for each of the peak samples. Using the peak timing provided by the branch filter coefficients instead of the original peak samples results in a more accurate estimate of the timings of the true peaks than the timings of the peak samples in the original pilot correlation signal and hence a more accurate channel estimate. While branch filter coefficients of a polyphase interpolator are employed to construct the modified correlation signal, the described technique does not require performing up-sampling of the correlation signal, thereby avoiding the higher sampling rates that would result from the actual implementation of a polyphase interpolator.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Described herein is a new technique for equalizing OFDM signals that have been constructed with a distributed pilot channel probe. This technique allows the receiver to make one attempt at equalizing the received signal and, optionally, to stop or continue refining the equalization with a second attempt. In the first attempt, the receiver constructs a "coarse" channel estimate with the channel probe, equalizes the received signal, and makes data decisions on the result. For the second attempt, the receiver subtracts the first-attempt data decisions from the received signal, leaving behind only a noise-plus-channel probe residual signal. The receiver constructs a "fine" channel estimate with the residual signal, equalizes the received signal, and makes data decisions on the refined equalized result. With this technique, novel, low-complexity signal processing techniques enable the receiver to use a simple correlator to accurately estimate multipath channel parameters and to refine a first-attempt channel estimation/equalization solution with decision feedback. This approach avoids the computationally-intensive adaptive algorithms that reach a single solution only after multiple iterations.

Figure 1:
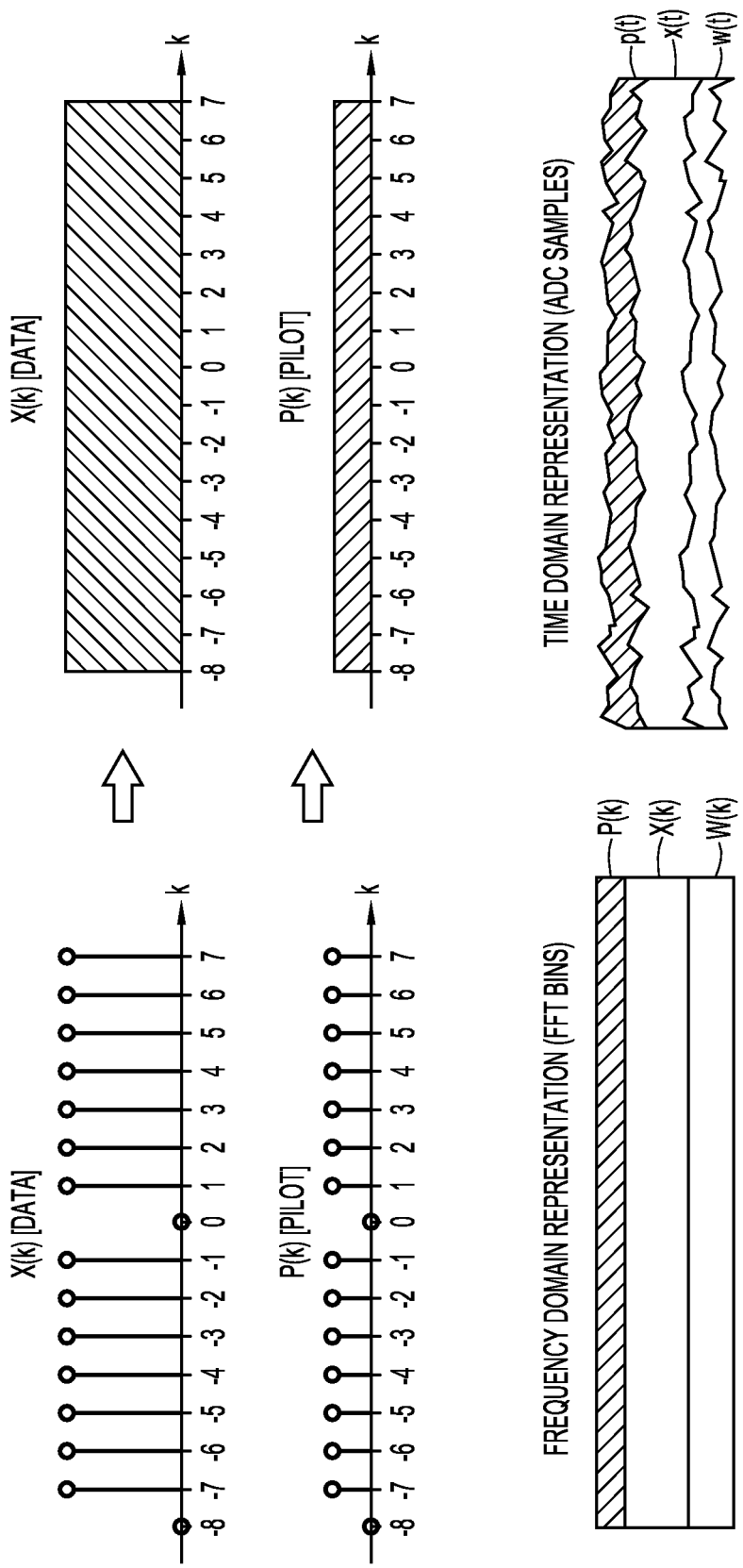
FIG. 1 is a set of graphs illustrating the conventions used throughout the drawings to simplify depiction of frequency and time domain signals.

FIG. 1 illustrates the signal representation conventions that are used throughout the description to simplify depiction of frequency and time domain signals. The graph in the upper left of FIG. 1 is a frequency domain representation of an OFDM data signal X(k), and the graph in the middle left of FIG. 1 is a frequency domain representation of a distributed channel probe pilot signal P(k). These frequency domain signals can be constructed via Fast Fourier Transforms (FFTs) for example. For ease of illustration, these discrete frequency domain signals will be represented with solid blocks extending over a frequency range corresponding to the frequency band of the signals, as shown on the upper right and middle right graphs of FIG. 1. Specifically, the frequency domain OFDM data signal X(k) and its corresponding time domain representations x(t) (analog) and x[n] (digitally sampled) will be shown as solid areas with cross hatching extending from the lower left to the upper right. The frequency domain pilot signal P(k) and its corresponding time domain representations p(t) (analog) and p[n] (digitally sampled) will be shown as solid areas with cross hatching extending from the upper left to the lower right. Additive white Gaussian noise (AWGN) will be indicated with cross hatching extending diagonally in both directions.

As described in greater detail below, a received OFDM signal r(t) contains both the OFDM data signal x(t), the distributed channel probe pilot signal p(t), and additive white Gaussian Noise (AWGN) or simply "noise" w(t) introduced in the transmission channel. Where a specific portion of the OFDM signal is of particular interest in a certain context, the cross-hatching will be shown on that portion of the OFDM signal, while the remaining portions will be left blank. For example, as shown in the bottom left graph of FIG. 1 (frequency domain), where the pilot signal P(k) is of interest, cross-hatching is shown on the pilot signal portion of the OFDM signal while the data signal X(k) and noise W(k) portions of the OFDM signal are blank. A corresponding time domain signal representation is shown in the lower right graph of FIG. 1.

Figure 2:
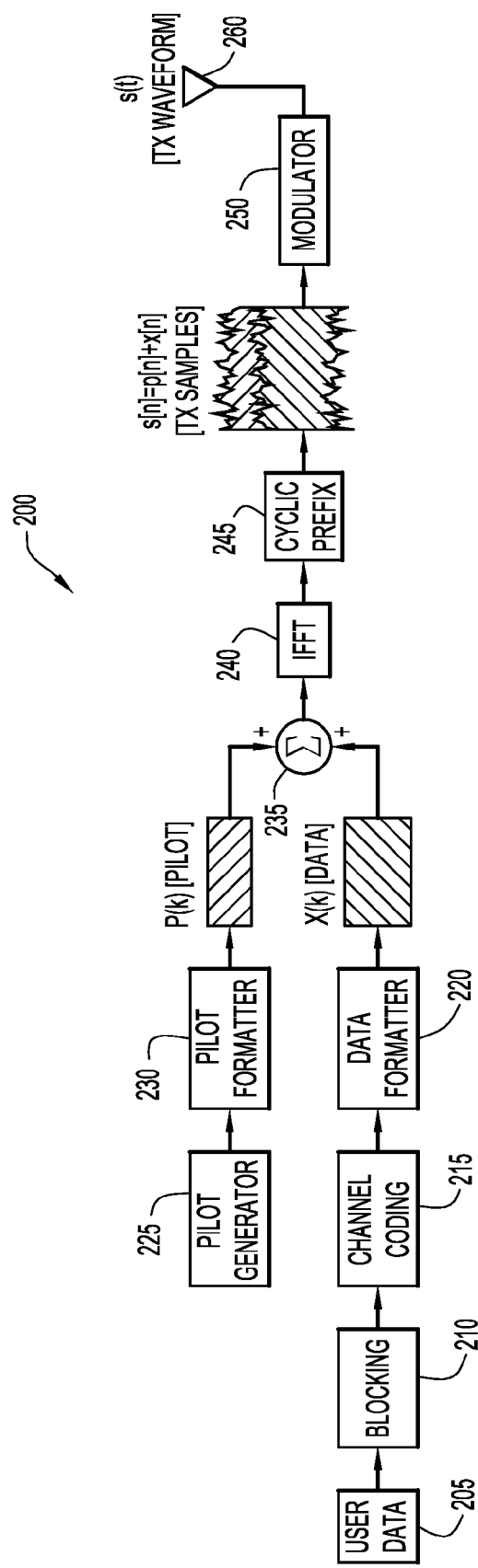
FIG. 2 is a functional block diagram illustrating a transmitter system for generating an OFDM signal containing an OFDM data signal and a band-limited distributed pilot signal.

An example of a scheme for generating an OFDM signal with a distributed pilot channel probe is shown in FIG. 2 in connection with a transmitter system 200. First describing the data portion of the signal, user data 205 is supplied from a user either in a serial or parallel format, and blocking 210 is performed on user data 205, which involves partitioning serial user data 205 into blocks. Where user data 205 is supplied in a parallel format, a parallel-to-serial conversion is perform prior to partitioning. Channel coding 215, such as error correction coding and interleaving, is performed on the partitioned data blocks. A data formatter 220 converts the data from real bits to complex symbols, and the signal magnitude is scaled to a desired level to produce a frequency domain OFDM data signal X(k). The OFDM data signal X(k) can be constructed as an FFT, with subcarriers of the OFDM signal formed at individual frequency bins of the FFT, as shown in the upper left graph of FIG. 1. In this context, the variable k refers to a particular frequency bin within the FFT.

Referring again to FIG. 2, a pilot generator 225 generates a sequence of real data bits, which are converted to complex symbols and scaled in magnitude by a pilot formatter 230 to produce a frequency domain pilot signal P(k). As with the OFDM data signal, the channel probe pilot signal P(k) can be generated as an FFT. The distributed pilot signal comprises a set of component pilot signals, with individual component pilot signals being formed at respective frequency bins of the FFT, as shown in the left middle graph of FIG. 1.

The frequency domain OFDM data signal X(k) and the frequency domain distributed pilot signal P(k) can be combined in the frequency domain via a combining or summing operation 235, resulting in a combined OFDM frequency domain signal. More specifically, the FFT that constitutes the frequency domain OFDM data signal X(k) is summed, bin by bin, with the FFT that constitutes the frequency domain distributed pilot signal P(k), such that a combined FFT signal S(k) containing both the data and pilot signals is generated at the transmitter, where:

$$S(k)=X(k)+P(k) \quad (1)$$

In effect, individual components of the distributed pilot signal are added to individual constituent data signals on a subcarrier-by-subcarrier basis. In this case, the value of the data signal is added to the value of the pilot signal on a bin-by-bin basis, where the amplitude of the pilot signal is less than the amplitude of the data signal in each bin. In the example of a 16-point FFT (see the upper left and middle left graphs of FIG. 1), each of numbered bins k=1 through 7 and −1 through −7 of the combined FFT is "populated" with both a discrete sub-carrier of the OFDM data signal and a component of the distributed pilot signal, such that every frequency bin within a band-limited constraint is used to transmit both data and pilot signals (all available subcarriers within a selected bandwidth transport the data and pilot signals). Stated another way, a component of the distributed pilot signal is present in the combined frequency domain signal at every data-carrying subcarrier of the OFDM data signal, and no subcarriers of the combined OFDM signal (no frequency bins of the FFT) are reserved exclusively for a component of the pilot signal.

As shown in the discrete graphs of FIG. 1 (the upper and middle left graphs), the frequency domain signal can be generated such that the OFDM data signal does not include a data-carrying subcarrier at a DC frequency bin of the combined FFT signal and the distributed pilot signal does not include a component pilot signal at the DC frequency bin of the combined FFT signal, i.e., the DC frequency bin (k=0) is not "populated" with a signal and X(0)=P(0)=0.

As suggested by the discrete graphs of FIG. 1, the magnitude of the OFDM data signal $R_D$ is the same in each data-carrying OFDM subcarrier (FFT bin), i.e., constant across all data-carrying OFDM subcarriers, and the magnitude of the pilot signal $R_P$ is also constant across all data-carrying OFDM subcarriers. Further, the magnitude of the pilot signal $R_P$ is a selected, constant fraction $\alpha$ of the magnitude of the data signal $R_D$ ($R_P=\alpha R_D$) in each data-carrying subcarrier, as controlled by data formatter 220 and pilot formatter 230. Note that, in the case of phase shift keying (PSK) modulation, the phases of the data and pilot signals in each frequency bin are not necessarily the same, such that the overall magnitude of the combined signal in each frequency bin, resulting from the vector sum of the data and pilot signals, varies as a function of the particular phases of the data and pilot signals.

To produce a symmetric spectrum of populated frequency bins in the frequency domain (but not necessarily symmetrically populated with the same data), both a constituent data signal and a component pilot signal are present in a same number of positive frequency bins and negative frequency bins of the combined FFT signal such that the number of frequency bins carrying the OFDM data signal and the distributed pilot signal is symmetric about the DC frequency bin of the combined FFT signal. In the example of a 16-point FFT shown in the discrete graphs of FIG. 1, this results in bins 1 through 7 and −1 through −7 being populated with data and pilot signals, while bin −8 is left empty (X(−8)=P(−8)=0) along with the DC bin (k=0). More generally, in an N-point FFT, the k=−(N/2) frequency bin can be left empty to achieve this result.

Referring once again to FIG. 2, to transmit the OFDM signal, the complex samples of the combined frequency domain signal S(k) are operated on by an inverse fast Fourier transform (IFFT) 240 to produce a sequence of complex samples s[n] in the time domain that can be processed for transmission, where s[n]=x[n]+p[n]. For an N-point FFT, each IFFT output constitutes an OFDM symbol having N time-domain samples, and an OFDM message includes a sequence of such symbols along with overhead, such as cyclic prefixes 245 which can be added to the transmit signal to aid in mitigating multipath effects. The complex samples s[n] of the transmit signal are supplied to a modulator 250 which generates an RF transmit waveform signal s(t) that is transmitted via an antenna 260 over the transmission channel (e.g., an over-the-air wireless channel).

A time-domain signal generated by performing an inverse FFT on an FFT signal is by its nature band limited. The samples of the time-domain symbols produced by the IFFT can be further band limited by leaving the highest frequency bins of the FFT empty and populating only lower-frequency FFT bins with OFDM subcarriers. Specifically, a band-limited OFDM signal and a band-limited distributed pilot signal can be constructed by assigning data subcarriers and component pilot signals to frequency bins 1 to Q and −1 to −Q, where Q is a positive integer less than N/2. In the example of a 16-point FFT, this further band limiting could be accomplished, for example, by leaving frequency bins 7 and −7 empty along with frequency bins 0 and −8 (i.e., Q=6).

Figure 3:
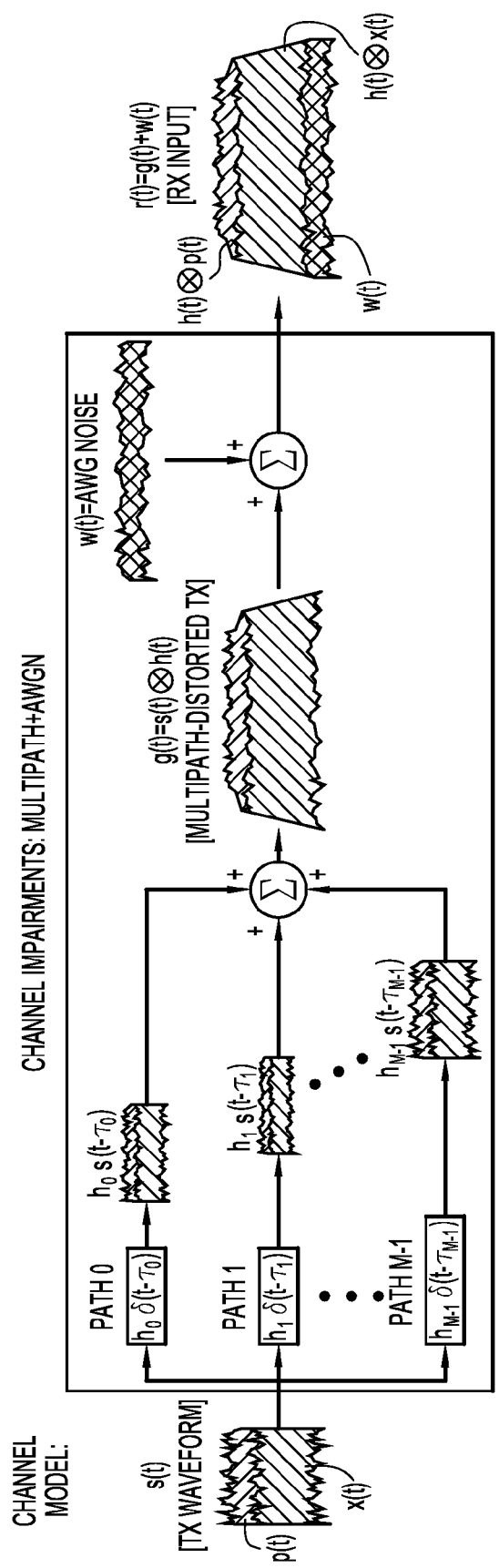
FIG. 3 is a diagram illustrating the impairment of the transmit signal with multipath interference and additive white Gaussian noise (AWGN) over the transmission channel.

FIG. 3 illustrates the impairments to the OFDM signal introduced in the transmission channel, in particular, multipath interference and AWGN. Signal reflections from various objects and surfaces cause the transmitted signal to travel to a receiver along a plurality of different paths. Each of M signal paths (0 through M−1) can be individually characterized by its impulse response $h_i$ to an impulse signal $\delta(t-\tau_i)$ (e.g., Path$_0$: $h_0\delta(t-\tau_0)$, Path$_1$: $h_1\delta(t-\tau_1)$, etc.), such that the transmit waveform s(t) traveling over a signal path i is characterized by $h_i s(t-\tau_i)$. Each impulse response $h_i$ has both magnitude and phase components, such that $h_i=|h_i|e^{j\Theta i}$. As shown in FIG. 3, the sum of the signals traveling over a set of M signal paths can be denoted by g(t):

$$g(t) = \sum_{i=0}^{M-1} h_i s(t-\tau_i) = s(t) \otimes h(t) = (p(t) \otimes h(t)) + (x(t) \otimes h(t)) \quad (2)$$

where h(t) denotes the overall multipath channel impulse response (CIR). Thus, g(t) represents the multipath-distorted transmit signal.

As further shown in FIG. 3, the transmission channel also introduces AWGN w(t) to the transmit signal such that the received signal r(t) arriving at the receiver can be expressed as:

$$r(t)=g(t)+w(t) \quad (3)$$

A distributed pilot signal transmitted from a source transmitter is useful for obtaining a channel estimate, preferably by performing at the receiver a relatively simple correlation that does not require complex hardware or processing. Thus, it is desirable to construct a band-limited pilot signal with autocorrelation properties that are as good as possible. At the receiver, the distributed pilot signal is essentially some time-domain pseudo-noise sequence that is identifiable to the receiver. An OFDM receiver implementing the techniques described herein does not require complex, iterative time domain estimation algorithms to separate the distributed pilot channel probe from the OFDM data.

Figure 4:
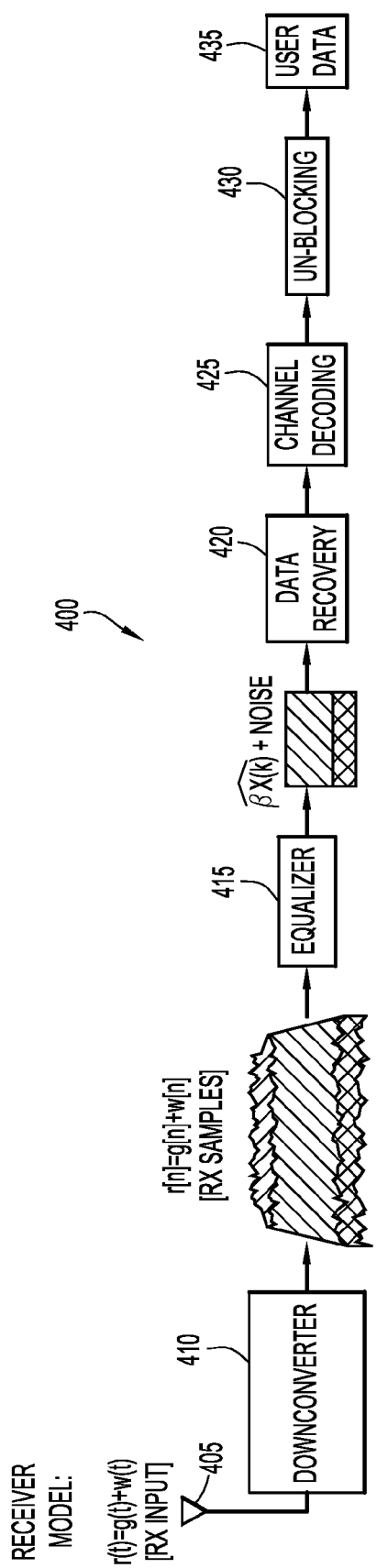
FIG. 4 is a functional block diagram illustrating a receiver system for recovering data from a received OFDM signal.

FIG. 4 is a functional block diagram illustrating a receiver system capable of recovering data from a received OFDM signal in a single equalization attempt or "pass" or, optionally, in two equalization passes involving a first, coarse equalization pass and then a second, fine equalization pass. Receiver system 400 includes an antenna 405, which can comprise one or more antenna elements, for receiving an OFDM signal transmitted over the transmission channel. As previously described, the received OFDM signal r(t) contains an OFDM data signal x(t) combined with an OFDM distributed pilot channel probe (pilot signal) p(t) both perturbed by: 1) multipath interference characterized by the channel impulse response h(t); and 2) AWGN w(t). Antenna 405 supplies the received RF signal to an RF signal processor 410 that performs operations (e.g., amplification, automatic gain control (AGC), down-conversion, A/D conversion, etc.) to convert the received RF signal r(t) to complex digital samples r[n] where $$r[n]=g[n]+w[n] \qquad (4)$$

The digital samples are supplied to an equalizer 415 configured to perform equalization in accordance with the techniques described herein in which an initial, coarse equalization can be followed by a fine equalization of the received OFDM signal based on decision feedback. After removal of the pilot signal, the equalizer output includes an estimate of the received OFDM data signal in the frequency domain X(k) scaled by a scaling factor $\beta(\beta\hat{X}(\hat{k}))$ plus noise. A data recovery module 420 converts the complex symbols of the estimated OFDM data signal to real bits, and a channel decoding module 425 performs error correction decoding and de-interleaving on the resulting blocks of data bits. An un-blocking module 430 converts the OFDM data blocks to serial bits which are supplied as user data 435. In the case where data is to be formatted in a parallel output, un-blocking module 430 also performs a serial-to-parallel conversion before supplying the output user data 435.

The architecture depicted in the various figures is conceptual to illustrate major functional units, and does not necessarily illustrate physical relationships or imply any specific implementation. The processing modules of receiver system 400 that perform the operations described herein (e.g., the correlator, equalizer, pilot removal module, data signal removal module, data recovery module, channel decoding module, and un-blocking module) can be implemented in hardware, firmware, software, or any combination of hardware, firmware, and software, and may include one or more processor devices and/or one or more software modules. For example, certain functional blocks (modules) or operations can be implemented using a processor executing program instructions (software) stored in a storage or memory unit to carry out operations. Thus, at least some of the operations and methodologies described herein can be carried out by executing instructions stored on a non-transitory computer readable medium (i.e., software) on a processor or processors. As used herein, the term "computer readable medium" refers to non-transitory (tangible) media (e.g., a memory or storage device).

Figure 5:
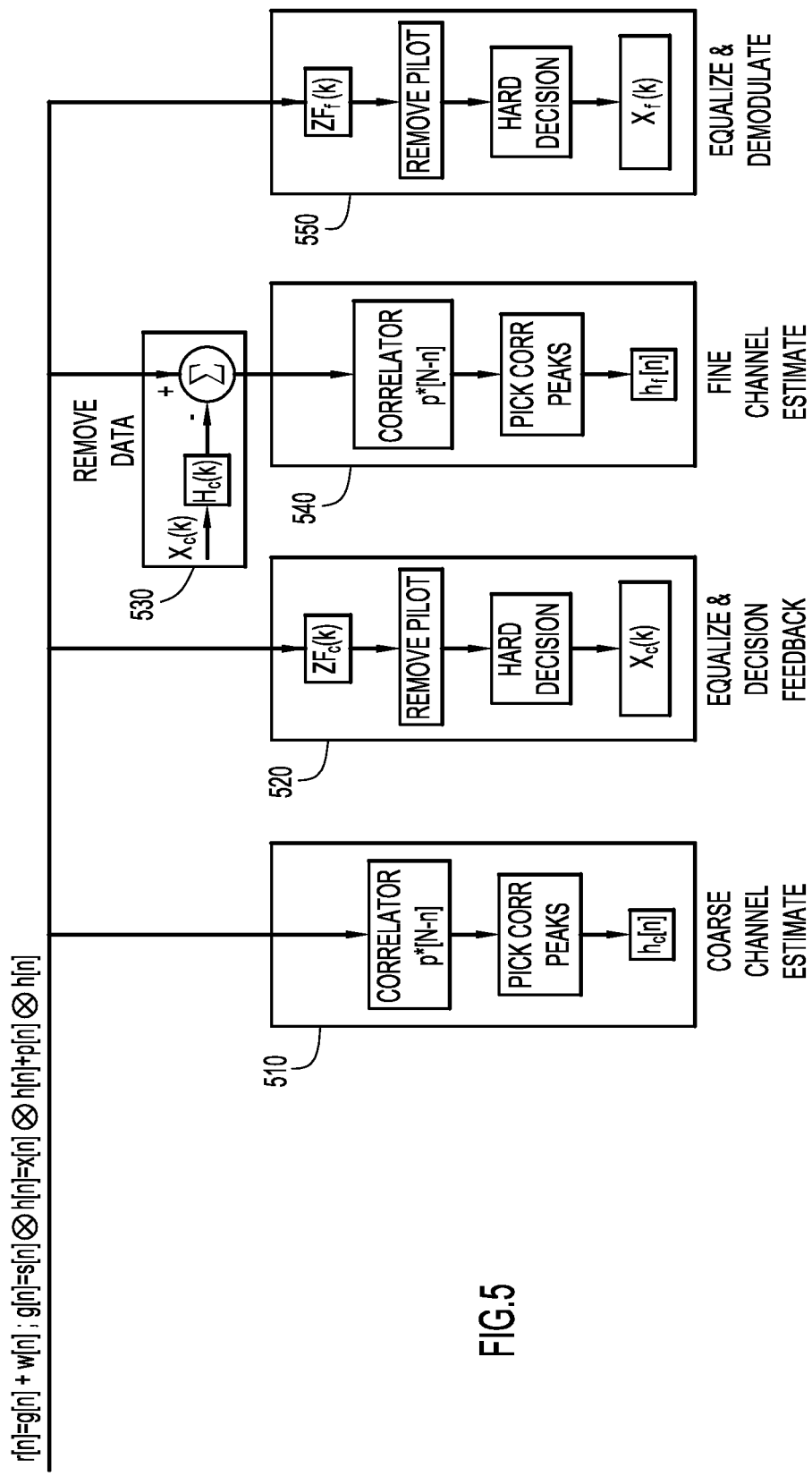
FIG. 5 is a top-level flow diagram illustrating a technique for channel estimation and data recovery in a receiver system.

FIG. 5 is a top level diagram illustrating the overall process for performing channel estimation and data recovery in a receiver system. Each of the major operations 510, 520, 530, 540, and 550 will be described in greater detail in connection with FIGS. 6-10, respectively. As previously described, the digitized received signal r[n] contains the originally transmit OFDM signal s[n], including the OFDM data signal x[n] and the pilot signal p[n], perturbed by the channel whose impulse response is h[n] and by noise w[n]. The receiver must equalize the received signal before demodulation to counteract the effects of channel multipath. The simplified channel estimation solution described herein exploits the properties of correlation between PN sequences. In particular, the PN properties of the distributed pilot are utilized to generate a correlation peak at each multipath component. Individually, the magnitude and phase of each correlation peak reveal both the relative strength of the given channel path ($|h_i|$) and the common phase error (CPE) component imposed by the given channel path ($\theta_i$). Collectively, the spacing between correlation peaks reveals the frequency-dependent error (FDE) components of each channel path. By extracting the magnitude, CPE and FDE components, a complete frequency-domain description of the channel H(k) can be obtained.

During data demodulation, the data signal is viewed as the desired signal and the distributed pilot as an interferer. However, the opposite is true during channel estimation, where the distributed pilot is viewed as the desired signal and the data as a much larger interferer. The iterative technique shown at a top level in FIG. 5 is used to enhance the accuracy of both the channel estimate and the subsequent demodulation of data.

As an overview, a coarse channel estimate operation 510 involves correlating the received OFDM signal r[n] with a stored replica of the distributed pilot signal p*[N−n] and locating correlation peaks to obtain a coarse channel estimate $h_c[n]$. At this stage, the data signal x[n] is an interference component of the correlator output, since only the distributed pilot signal is of interest. If as much of the interfering data signal as possible could be removed, the channel estimate could be refined. However, the coarse channel estimate is useful in the next few operations.

In operation 520, the coarse channel estimate can be used to equalize the received OFDM signal and remove the distributed pilot signal. Specifically, a frequency-domain coarse zero-forcing function $ZF_c(k)$ is constructed by first performing an FFT on the coarse channel estimate $k_c[n]$ to obtain the frequency-domain coarse channel estimate $H_c(k)$. Then $ZF_c(k)$ is obtained by inverting the magnitude and conjugating the phase of the frequency-domain channel estimate $H_c(k)$. The received OFDM signal r[n] is equalized with the coarse zero-forcing function $ZF_c(k)$ in the frequency domain to remove multipath distortions. The pilot signal is then removed from the equalized signal in the frequency domain using, for example, the techniques described in U.S. patent application Ser. No. 13/362,794, entitled "Removal of a Band-Limited Distributed Pilot from an OFDM Signal," the disclosure of which is incorporated herein by reference in its entirety. Hard data decisions can be made to recover an initial coarse estimate $X_c(k)$ of the data contained in the OFDM data signal X(k).

At this point, the equalizer function could be terminated after a single pass. However, the first-pass data decisions can be used in a feedback mode to refine our channel estimate, and hence our data estimate. As shown in operation 530, the coarse channel estimate $H_c(k)$ and first-pass data decisions $X_c(k)$ can be used to remove the effects of the (interfering) data from the received OFDM signal. The remaining signal consists primarily of the distributed pilot that has passed through the channel, plus AWGN and perhaps some residual data due to the use of the coarse channel estimate.

In operation 540, the correlation operations previously described in operation 510 are repeated but using only the remaining portion of the received OFDM signal (i.e., primarily the pilot signal with the data signal substantially removed). Since this operation involves correlating primarily the received pilot signal against the stored replica of the pilot signal, a more accurate fine channel estimate is obtained. In operation 550, the equalization and pilot removal operations previously described in operation 520 are repeated to obtain more accurate hard data decisions $X_f(k)$, and the recovered data can then be further processed as shown in FIG. 4 (e.g., demodulate, channel decoding, un-blocking, etc.) to acquire the user data.

The process summarized in FIG. 5 will be described in more detail in connection with FIGS. 6-10. Essentially, the described technique attempts to "clean up" an OFDM signal that was transmitted over the air so that the signal can be successfully demodulated to recover the information contained therein. The objectives of the equalizer are: to mitigate the effects of h(t), the multipath channel impulse response; to remove as much of the distributed pilot as possible after multipath mitigation; and to pass along the remaining data plus noise signal to the receiver's data recovery (demodulation) module.

For the equalizer, it is assumed that:
1) h(t) can be adequately approximated as a sum of discrete "path" components:

$$h(t)=\Sigma_{i=0}^{M-1}h_i\delta(t-\tau_i);$$

2) if the equalizer can construct a high-quality estimate of h(t), the equalizer can "invert" that estimate to substantially mitigate the multipath distortion;
3) a local copy of the pilot signal is available in both the digital time-domain format p[n] and in the frequency-domain format P(k); and
4) correlating the received signal against a local copy of the pilot produces discrete correlation peaks that can be used to estimate h(t):
   a) each correlation peak corresponds to a discrete "path" in the multipath channel impulse response: $h_i\delta(t-\tau_i)$;
   b) the magnitude and phase of each correlation peak is proportional to a "path" coefficient $h_i$; and
   c) the location of each correlation peak corresponds to a "path" delay: $\tau_i$.

Figure 6:
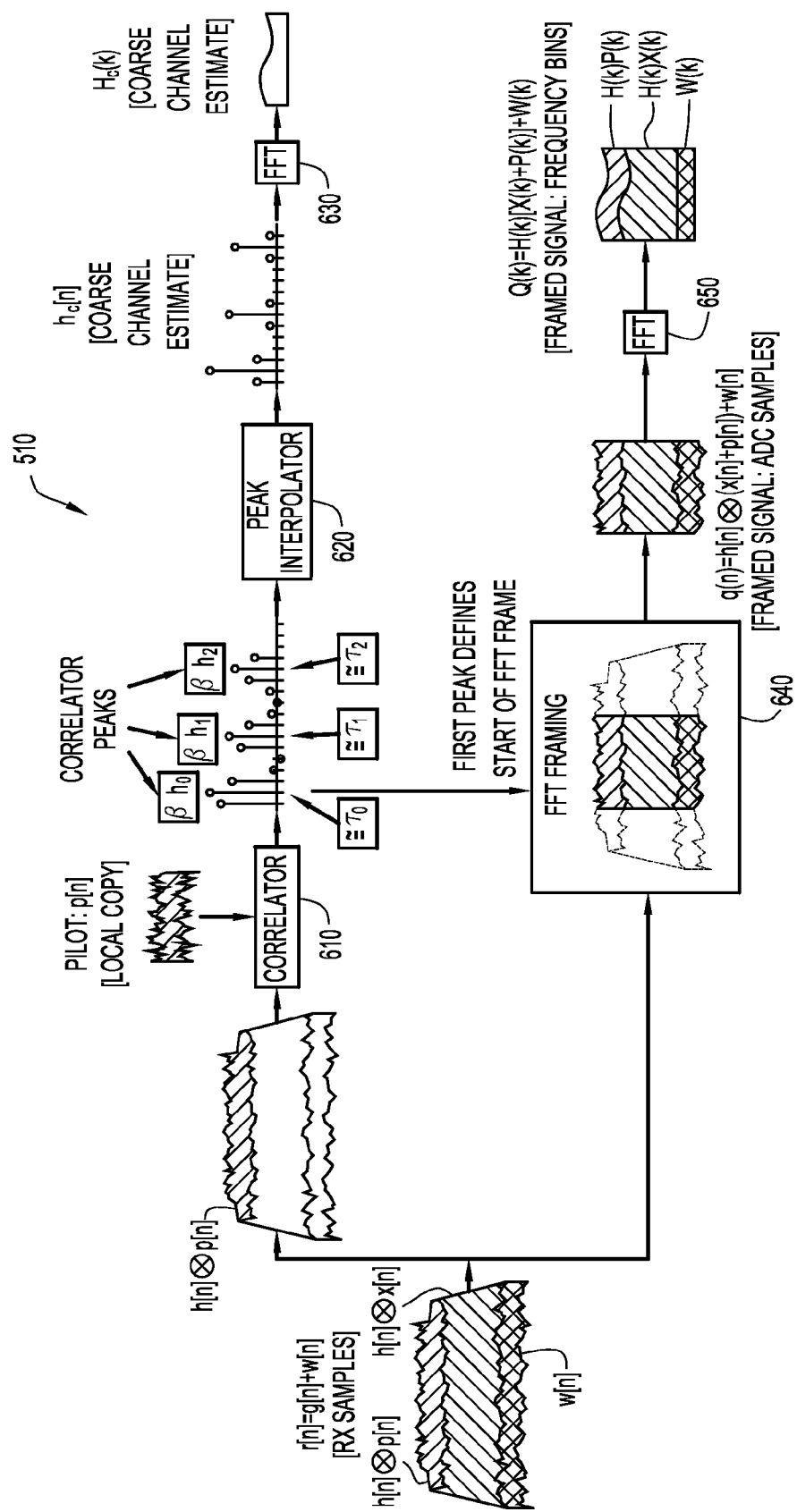
FIG. 6 is a functional flow diagram illustrating operations performed by a receiver system to effect course channel estimation.

The presence of data "interference" reduces the quality of the correlation peaks, and the corresponding h(t) estimate. If data "interference" can be removed from the received signal before correlation, the equalizer can obtain a much higher quality channel estimate. Thus, the first step is to characterize the channel that the signal passed through by determining the channel impulse response h(t). FIG. 6 illustrates the receiver components and processing involved in developing the coarse channel estimate (operation 510 in FIG. 5). In the first equalization pass, the entire received OFDM signal r[n] (including the data and pilot signals) is supplied to a correlator 610 in the time domain, which correlates the signal r[n] with a local copy (stored replica) of the pilot signal p[n]. Since the receiver repeatedly processes the received OFDM signal r[n] in the technique described herein, the received signal r[n] is stored in memory for retrieval as needed. As suggested by the cross hatching shown on the input signal to correlator 610, only the received pilot signal p[n] is of interest, and the data signal x[n] and the noise w[n] are viewed as interference in this context.

The correlator output comprises a sequence of samples that are compared to a threshold to identify peak time-domain samples in the correlation signal sample stream. A cluster of peaks typically indicates reception of a signal over a multipath channel, with each peak representing one of the signal paths of the channel. Specifically, each peak sample i (i=0 to M-1) comprises a scaled impulse response $\beta h_i$ occurring at a time $\tau_i$. The timing accuracy of the peak samples is limited by the sampling rate (i.e., each true peak timing can occur at any point in continuous time). As described in greater detail below, to more accurately determine the peak timings (and hence obtain a more accurate channel estimate), a set of samples near each correlator peak is supplied to a peak interpolator 620, which performs parabolic interpolation to closely estimate the "true" peaks. Each of the computed true peaks is then used to identify one of a plurality of branch filters of a polyphase interpolator which most closely approximates the timing of the true peak, and the channel estimate is constructed by replacing the correlator output samples with the filter coefficients of the branch filter selected for each correlator peak.

Since this first-pass channel estimate was performed by correlating the entire received OFDM signal r[n] against the local pilot signal p[n], the resulting time-domain channel estimate is a coarse channel estimate $h_c[n]$, since its accuracy is diminished by interference from the data signal x[n] contained in the received OFDM signal. As shown in FIG. 6, a frequency-domain coarse channel estimate $H_c(k)$ can be obtained by applying an FFT 630 to the time-domain coarse channel estimate $h_c[n]$, which can subsequently be used to generate a zero-forcing function as described below.

As shown in FIG. 6, the timing of the first peak of the coarse channel estimate is also used to determine which time segment of the buffered received OFDM signal r[n] should be converted to a frequency domain signal for further processing. Specifically, the timing of the first peak is supplied to an FFT framing module 640, which defines the beginning of the set or "frame" of received time-domain OFDM signal samples q[n] that will be converted to a frequency domain signal Q(k) via an FFT 650, where:

$$Q(k)=H(k)[X(k)+P(k)]+W(k) \quad (5)$$

Figure 7:
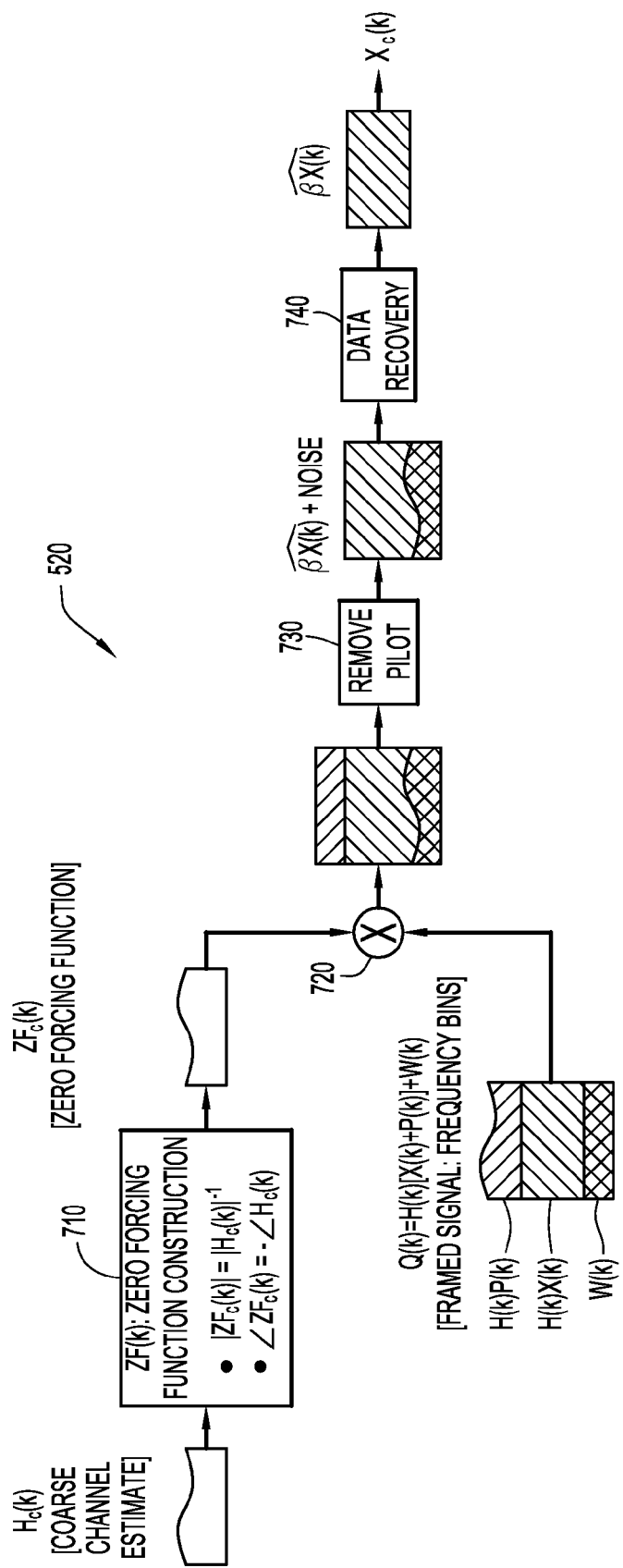
FIG. 7 is a functional flow diagram illustrating operations performed by a receiver system to effect coarse equalization and data recovery.

FIG. 7 illustrates the receiver components and processing involved in performing equalization, pilot removal, and decision feedback (operation 520 in FIG. 5). After identifying the coarse channel estimate $H_c(k)$, the second stage of the equalization process involves essentially applying an inverted version of the channel estimate to the received OFDM signal in the frequency domain to, in effect, reverse or undo the impairment introduced by the multipath channel. An inverted form of the channel estimate is denoted as a zero forcing function. A frequency-domain zero-forcing function $ZF_c(k)$ can be obtained by inverting the magnitude and conjugating the phase of frequency-domain coarse channel estimate $H_c(k)$ as:

$$ZF_c(k)=|H_c(k)|^{-1}e^{-j\cdot\angle H_c(k)}$$

$$|ZF_c(k)|=|H_c(k)|^{-1}$$

$$\angle ZF_c(k)=-\angle H_c(k) \quad (6)$$

As shown in FIG. 7, equalization is performed by multiplying (720) the framed, frequency domain received OFDM signal Q(k) by the frequency-domain coarse zero forcing function $ZF_c(k)$ to coarsely remove the multipath channel distortions from the received signal. The term "zero forcing" refers to the notion of forcing the range of signal amplitudes, from high peaks to low troughs, to a normalized value that results in essentially a flat response. In this context, the zero forcing function basically operates as a compensation filter that restores the signal in the frequency domain to the ideal flat response. Though the coarse zero forcing function is applied in the frequency domain, with respect to the corresponding time domain signal, where the signal is a set of time-delayed and scaled versions of the original signal, the effect is to apply a filter that provides a judicious selection of magnitudes, phases, and delays that realign the various multipath signals.

Referring again to FIG. 7, after equalization, a pilot removal module 730 removes the distributed pilot signal. As previously noted, an example of a technique for removing a distributed pilot signal from a received OFDM signal is described in U.S. patent application Ser. No. 13/362,794. According to that technique, removal of a band-limited distributed pilot from a received OFDM signal involves determining what portion of the received signal is attributable to the pilot signal and using that information along with the known pilot waveform structure to remove the pilot signal from the OFDM signal, thereby effectively separating the OFDM data signal and the distributed pilot signal that are contained within the equalized received OFDM signal. This scheme takes advantage of the symmetry found in the constellation of possible signal states of an OFDM signal to determine the magnitude of the distributed pilot signal within the OFDM signal. In the case of a quadrature phase shift keying (QPSK) signal, each populated frequency bin k of an FFT contains the components of the complex data signal $X(k)=I_{X(k)}+jQ_{X(k)}$ and the components of the complex pilot signal $P(k)=I_{P(k)}+jQ_{P(k)}$ such that:

$$S(k)=(I_{X(k)}+I_{P(k)})+j(Q_{X(k)}+jQ_{P(k)}) \quad (7)$$

By knowing the predetermined ratio of the magnitudes of the data signal and pilot signal (α) and by knowing the pilot signal P(k), the receiver can recover X(k) from the FFT bins of the equalized received signal by substantially removing the P(k) bin components from the sum of X(k)+P(k). The value of α is known by design, and P(k) can be known, for example, by time-based synchronization.

In the QPSK example, since each populated FFT bin of the OFDM signal in the frequency domain includes the sum of a data subcarrier X(k) and a distributed pilot signal component P(k), the signal constellation for the combined signal S(k) (S(k)=X(k)+P(k)) consists of sixteen possible states for the components of S(k) ($I_{S(k)}$, $Q_{S(k)}$), which represent the sixteen possible vector sums of the four data signal states and the four pilot signal states, where S(k) is given by equation (7). Essentially, based on the combinations of the two possible states for each of $I_{X(k)}$, $I_{P(k)}$, $Q_{X(k)}$, and $Q_{P(k)}$, the constellation includes four "clouds" each having four possible states, with one cloud in each of the four quadrants. Each of these clouds is centered about one of the four possible signal constellation states of the data signal. Due to the characteristics of the pilot signal structure, each of the four states in each cloud is equally likely to occur. In this case, given a specific value of the data signal, the probability of each constellation point in its "cloud" occurring is one-fourth. Consequently, the average value of the four states in each cloud has a center of mass at the center of the cloud, which is equivalent to the position of the constellation point of the data subcarrier signal. That is, for each "cloud" in the combined signal constellation, the average value of the constellation states is equal to the magnitude of the constellation state of only the underlying data subcarrier signal (i.e., without the pilot signal). This symmetric characteristic of the combined signal constellation enables determination of the magnitude of the pilot signal at the receiver using simple averaging.

After removal of the pilot signal, what remains is a frequency domain signal comprising a scaled, coarse estimate of the original data signal $X_c(k)=\hat{\beta}\hat{X}(k)$ plus AWGN. As previously described in connection with FIG. 4, a data recovery module 740 performs hard data decisions on this residual signal to recover the frequency domain data signal $X_c(k)$. While this process, in effect, removes noise from the data signal, the bit error rate of the recovered data is impacted not only by noise but also by the interfering effects of the data signal contained in the received OFDM signal that was correlated with the pilot replica.

Figure 8:
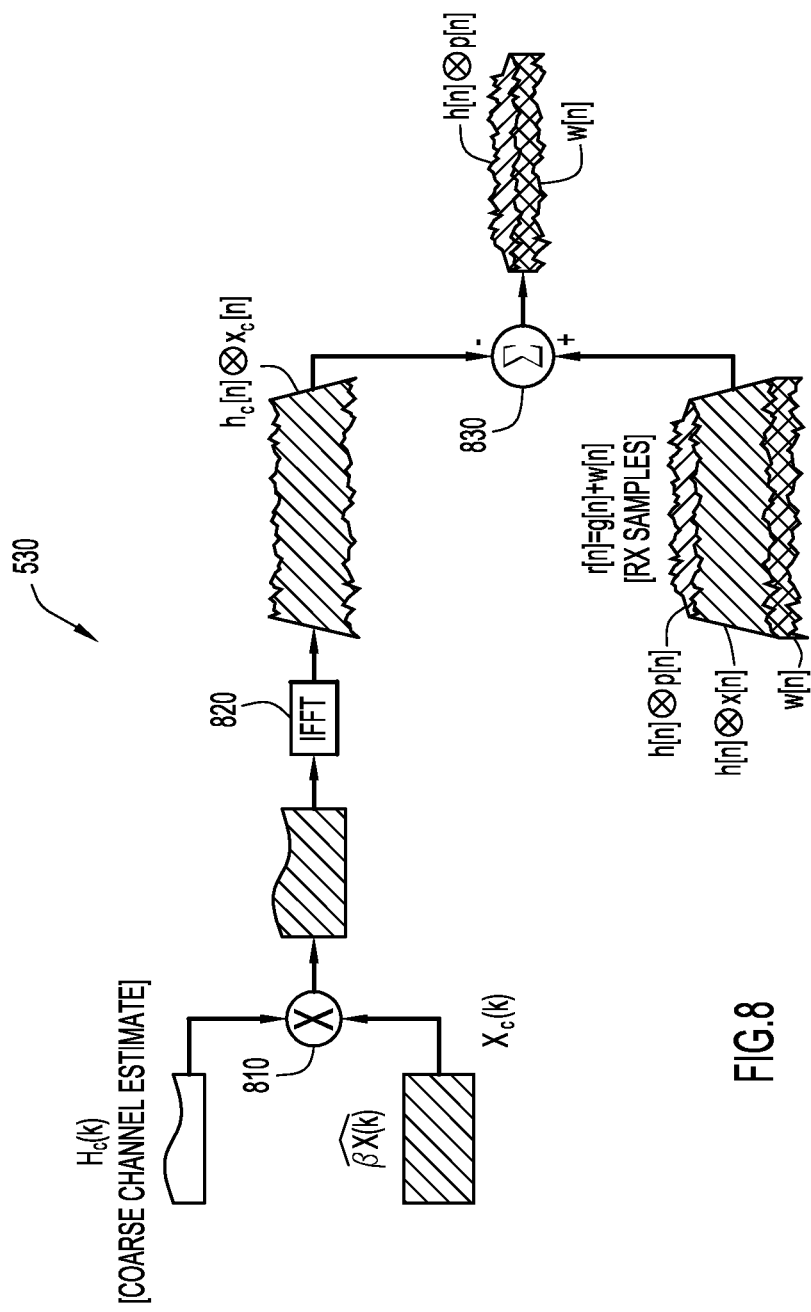
FIG. 8 is a functional flow diagram illustrating operations performed by a receiver system to effect removal of a coarse-recovery OFDM data signal from a received OFDM signal.

To more accurately recover the data signal, a second equalization pass can be performed based on a better channel estimate determined by correlating the pilot signal substantially without interference from the received data signal. FIG. 8 illustrates the receiver components and processing involved in removing the data signal from the received OFDM signal (operation 530 in FIG. 5). In order to remove the data signal from the received OFDM signal, the data signal must be constructed locally in the distorted manner it would exist within the received signal. To approximate this channel-distorted data signal, the frequency-domain coarse estimate of the data signal $X_c(k)=\hat{\beta}\hat{X}(k)$ is multiplied (810) by the frequency-domain coarse channel estimate $H_c(k)$, and an inverse FFT (IFFT) 820 is applied to the resulting signal to produce the channel-distorted data signal: $x_c[n] \otimes h_c[n]$. The channel-distorted data signal is then subtracted (830) in the time domain from the buffered, received OFDM time-domain signal r[n], leaving as a residual signal the channel-distorted pilot signal $p[n] \otimes h_c[n]$ plus noise w[n].

Figure 9:
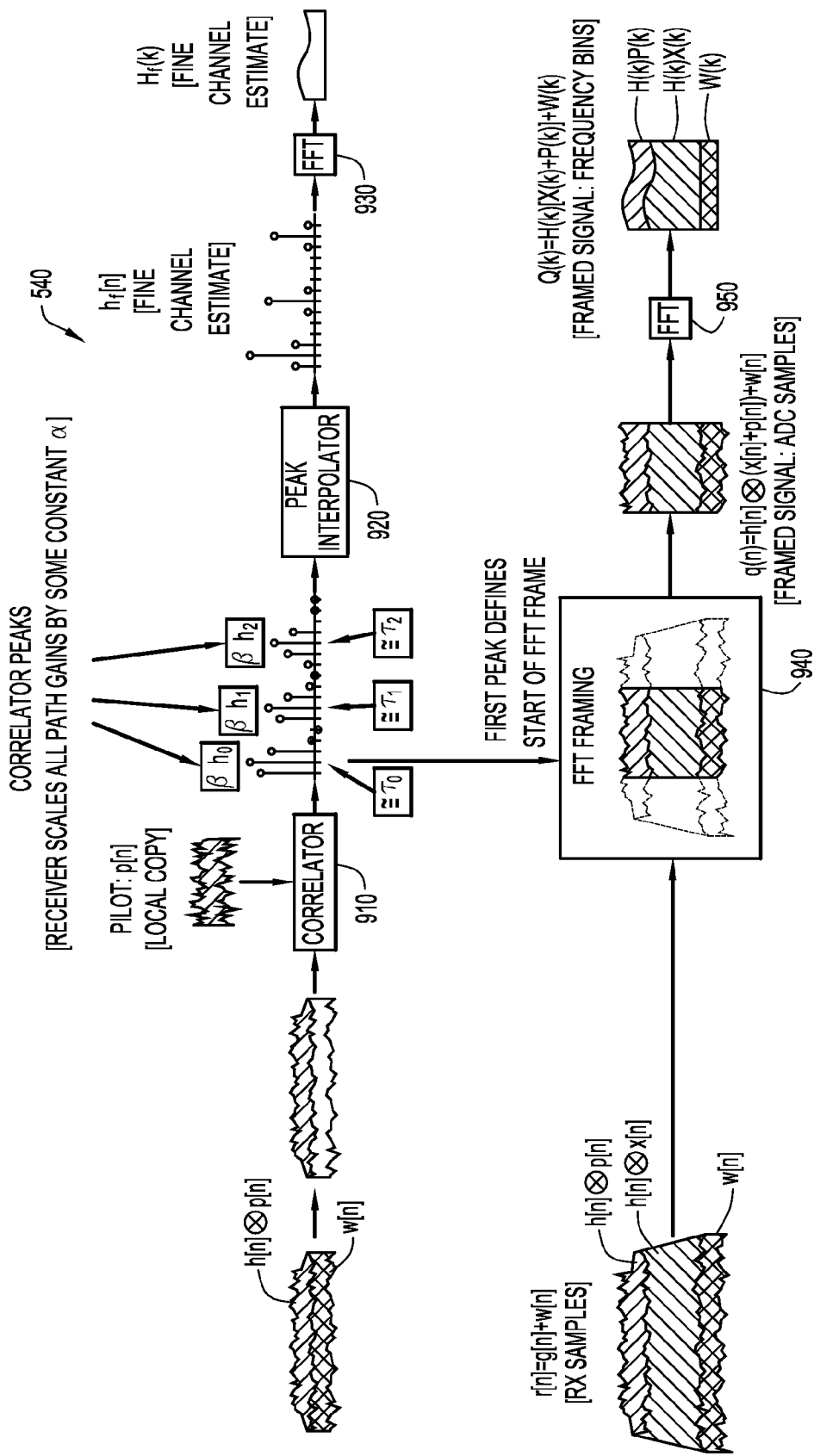
FIG. 9 is a functional flow diagram illustrating operations performed by a receiver system to effect fine channel estimation.
Figure 10:
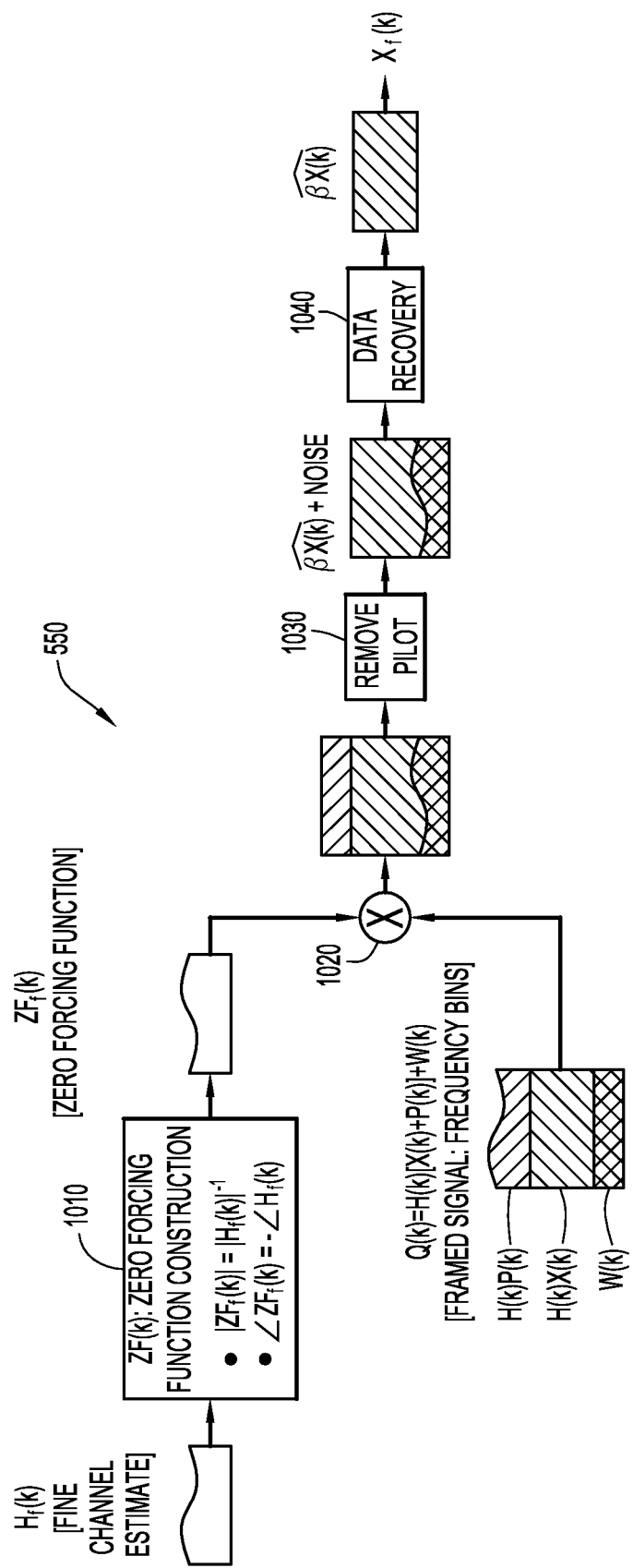
FIG. 10 is a functional flow diagram illustrating operations performed by a receiver system to effect fine equalization and data recovery.

This residual pilot signal, inclusive of noise, is usable to perform a second equalization pass that produces a fine channel estimate. FIG. 9 illustrates the receiver components and processing involved in developing the fine channel estimate (operation 540 in FIG. 5), and FIG. 10 illustrates the receiver components and processing involved in performing fine equalization, pilot removal, and data recovery (operation 550 in FIG. 5). By comparing FIG. 9 with FIG. 6, it can be seen that the processing for determining the fine channel estimate $H_f(k)$ is the same as the processing for determining the coarse channel estimate except that the signal being correlated in the fine channel estimation process is only the received residual pilot signal plus noise (data signal removed) instead of the entire received OFDM signal (which includes the data signal). The absence of the data signal, which acts as interference in the pilot correlation process, significantly enhances the accuracy of the resulting correlation signal and ultimately the channel estimate.

Otherwise, correlator 910, peak interpolator 920, FFT 930, FFT framing module 940, and FFT 950 operate in much the same manner as the corresponding components shown in FIG. 6, and operation of the equalizer 1010, 1020 and pilot removal module 1030 of FIG. 10 operate in much the same manner as the corresponding components in FIG. 7. In this regard, correlator 910 in FIG. 9 can be considered a "fine" correlator, whereas correlator 610 in FIG. 6 can be considered a "coarse" correlator. Likewise, the equalizer 1010, 1020 and pilot removal module 1030 in FIG. 10 can be considered a "fine" equalizer and "fine" pilot removal module, respectively, whereas the equalizer and pilot removal module in FIG. 7 can be considered their "coarse" counterparts. Nevertheless, in actual implementation a single software or hardware module optionally can operate as both a coarse and fine module (e.g., the same equalizer can be used as both coarse and fine equalizer).

As shown in FIG. 10, after identifying the fine channel estimate $H_f(k)$, the second stage of the fine equalization process involves inverting the fine channel estimate $H_f(k)$ to obtain the fine frequency-domain zero-forcing function $ZF_f(k)$ ($|ZF_f(k)|=|H_f(k)|^{-1}$) in the same manner as in the coarse equalization processing. Fine equalization is performed by multiplying (1020) the framed, frequency domain received OFDM signal Q(k) by the frequency-domain fine zero forcing function $ZF_f(k)$ to finely remove the multipath channel distortions from the received signal. After equalization, a fine pilot removal module 1030 removes the distributed pilot signal in the same manner described above in connection with FIG. 7, leaving a frequency domain signal comprising a scaled, fine estimate of the original data signal $X_f(k)=\hat{\beta}\hat{X}(\hat{k})$ plus AWGN. As previously described in connection with FIG. 4, a data recovery module 1040 performs hard data decisions on this residual signal to recover the frequency domain data signal $X_f(k)$, followed by channel decoding and un-blocking to produce the user data.

Figure 11:
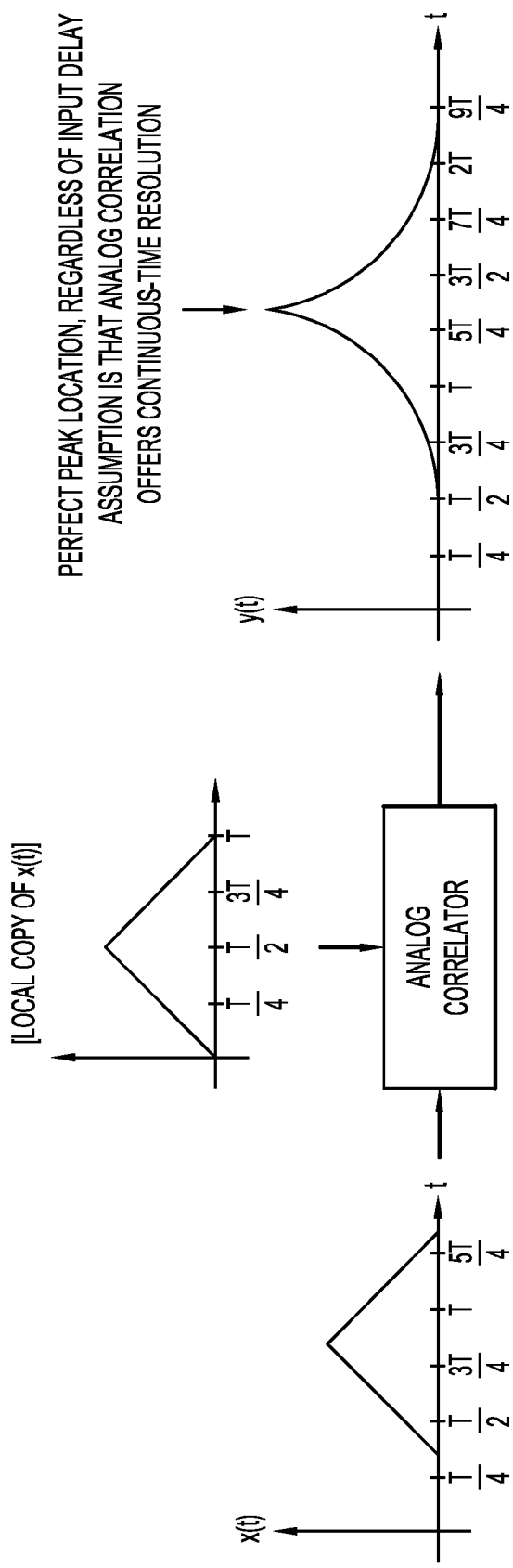
FIG. 11 is a diagram illustrating operation of an ideal analog correlator.

Ideally, the correlator would be able to identify the timing of the correlation peaks with infinite resolution so that the timing and separation of the multipath signals are perfectly determined. This concept can be illustrated with the theoretical analog correlator shown in FIG. 11. A received analog signal x(t) is convolved with a local copy of x(t) by the analog correlator and produces an analog correlation signal. Since the analog correlation offers continuous time resolution, the timing of the peak is perfectly determined, regardless of the input delay.

The digital correlator 610, 910 described herein and used to correlate against the pilot signal to determine the channel impulse response operates only on discrete analog-to-digital converter (ADC) samples such that the correlator output can resolve correlation peak timings only to the ADC sample boundaries. However, path delays between multipath components are typically much less than the ADC sample period. Efficient and low-cost receiver architectures typically sample signals only at the minimum (Nyquist) rate needed to represent the signal. The "true" timing of a correlation peak can occur anywhere between adjacent ADC samples, and on average lies halfway between them.

Figure 12:
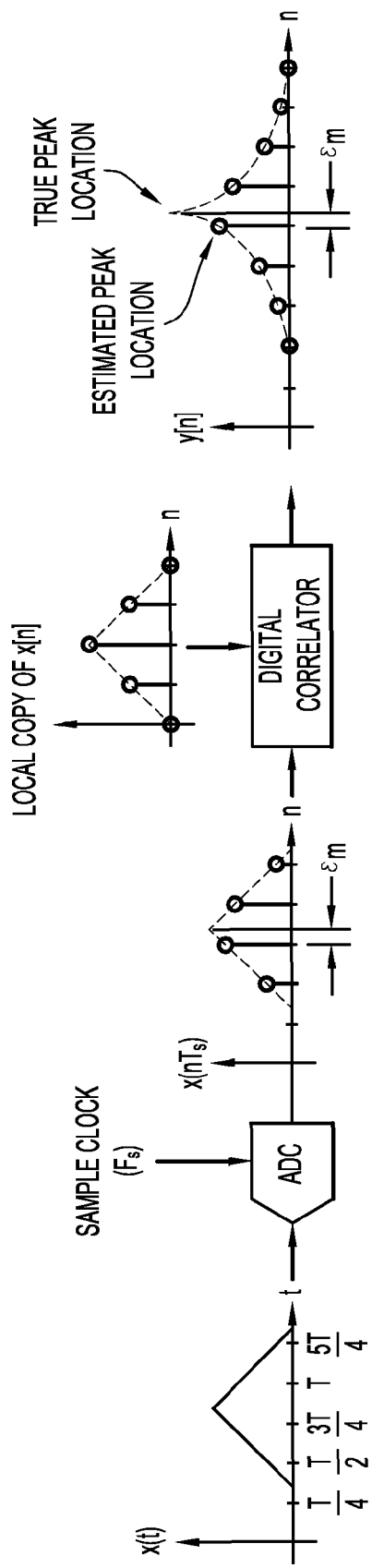
FIG. 12 is a diagram illustrating operation of digital correlator for comparison with the analog correlator of FIG. 11.

This concept is illustrated with the simple digital correlator example shown in FIG. 12. The received analog signal is sampled by the ADC at a sampling rate of $F_s$ to produce a steam of digital samples $x(nT_s)$. In this example, the "true" peak of the received signal is offset from the closest sample by a timing difference (error) $\epsilon_m$. The sampled received signal is convolved with a local digital copy of the of the signal x[n] by a digital correlator to produce a digital correlation signal y[n] (in this context, x[n] generically denotes an input signal to be correlated and should not be confused with the earlier use of x[n] to denote an OFDM data signal). Due to the peak timing offset $\epsilon_m$ in the sampled signal, the estimated peak timing in the correlation signal, represented by the largest-magnitude sample, is offset from the true peak timing by $\epsilon_m$.

From the foregoing, it will be appreciated that, on average, the correlator peak timing estimate will have a half-sample timing error. A peak timing error of a half sample at the Nyquist rate may be inadequate for estimating the channel impulse response h(t) in many systems. The desire to get better timing resolution is driven by the fact that a fairly precise knowledge of where separate peaks occurred is needed in order to accurately characterize the channel, and separation on multipath signals might be less than what can be represented at sampling rate. ADC oversampling can reduce this error, but only at the expense of costlier ADC hardware and higher power consumption of the signal processing hardware (ASIC, FPGA, DSP, etc.). Moreover, there is often a tradeoff between the available sample rate and the number of bits provided by the ADC. Generally, the lower the sampling rate that can be tolerated, the more bits that can be retained in the ADC output. Thus, it would be desirable for the correlator to be able to adequately resolve correlator peak timings by sampling only at near-Nyquist ADC sample rates.

In accordance with another aspect of the described system, the peak interpolator (see FIG. 6 (620) and FIG. 9 (920)) enables a finer resolution than the sampling rate to be achieved in determining the timing of correlator peaks without increasing the sampling rate above the minimum otherwise required by the signal characteristics. As an overview of the operation of the peak interpolator, for each path in the multipath channel impulse response, the difference $\epsilon_m$ between the true and estimated peak timings is computed. Then, for each path, a filter $g_m[n]$ is constructed that shifts the local copy of p[n] to yield an output that closely resembles $p(nT_s)$ where $$p(nT_s) \approx p[n] \otimes g_m[n] \qquad (8)$$

Finally, a multipath channel impulse response is formed by suitably delaying and adding all of the filters $g_m[n]$ respectively associated with all of the peaks in the correlation signal.

Figure 13:
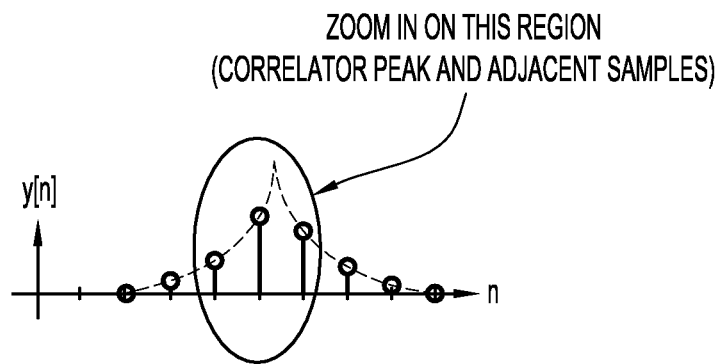
FIG. 13 is a diagram illustrating a set of samples for determining the timing of a correlation peak.

In the first stage of the peak interpolator, to determine the timing of each true peak, a parabolic interpolation can be performed on each correlation peak sample and its adjacent samples. In the example shown in FIG. 13, three samples are used: the peak sample and the two immediately adjacent samples (the sample just before the peak and the sample just after the peak). The technique is not limited to the example of exactly three samples, and additional samples in the vicinity of the peak sample can be used in the correlation process, depending on the particular curve matching interpolation performed.

Figure 14:
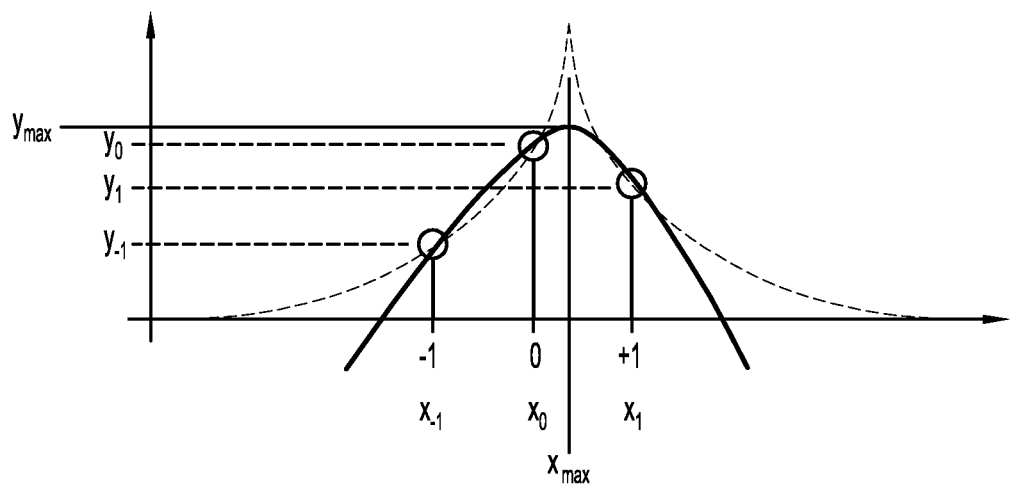
FIG. 14 is a diagram illustrating a parabolic interpolation technique for estimating a "true" peak location.

As shown in FIG. 14, the parabolic interpolation technique attempts to construct a parabola that extends through the samples. The vertex of the parabola (i.e., its highest point) is assumed to correspond to the timing of the true peak. For example, if the x-y coordinates of the three samples are ($x_{-1}$, $y_{-1}$), ($x_0, y_0$), and ($x_1, y_1$), and the equation of the parabola is given by $y=Ax^2+Bx+C$, then the coefficients A, B, and C that are the best fit to the three sets of points can be determined as follows:

$$\begin{bmatrix} y_{-1} \\ y_0 \\ y_1 \end{bmatrix} = \begin{bmatrix} x_{-1}^2 & x_{-1} & 1 \\ x_0^2 & x_0 & 1 \\ x_1^2 & x_1 & 1 \end{bmatrix} \begin{bmatrix} A \\ B \\ C \end{bmatrix} \Rightarrow \begin{bmatrix} A \\ B \\ C \end{bmatrix} = \begin{bmatrix} -1^2 & -1 & 1 \\ 0^2 & 0 & 1 \\ 1^2 & 1 & 1 \end{bmatrix}^{-1} \begin{bmatrix} y_{-1} \\ y_0 \\ y_1 \end{bmatrix} \qquad (9)$$

The value of x that corresponds to the peak value of y (i.e., the timing of the true peak) can be determined by setting the derivative of the parabola to zero and solving for the value of x that maximizes y:

$$y' = 2Ax + B = 0 \Rightarrow x_{max} = -\frac{B}{2A} \qquad (10)$$

Setting $x_{-1}=-1$, $x_0=0$, and $x_1=1$ accomplishes two objectives. First $x_{max}$ is equal to $\epsilon_m$, the difference between the true and estimated peak timings. Second, $\epsilon_m$ is always constrained to fall within the range $|\epsilon_m| \leq 0.5$.

Figure 15:
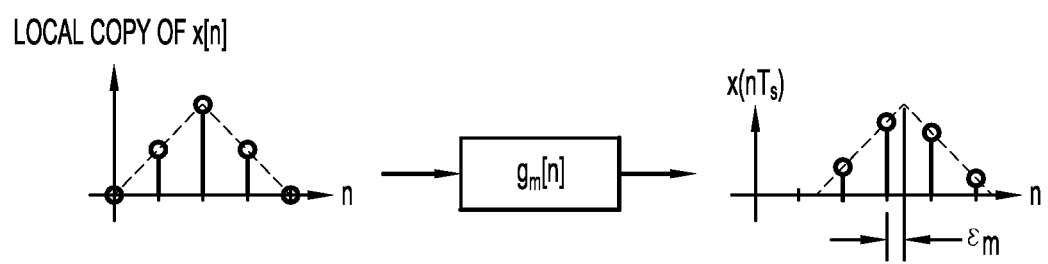
FIG. 15 is a block diagram illustrating implementation of a technique for modifying a correlation signal using one branch filter of a polyphase interpolator to adjust the timing of the input samples relative to the signal peak.

In the second stage of the peak interpolator, the computed timing of the true peak for each signal path of the multipath channel is used to select one branch filter $g_m[n]$ from among a plurality of branch filters of a polyphase interpolator that provides a fractional delay as close to $\epsilon_m$ as possible (i.e., the branch filter that provides a fractional delay having a minimal timing offset relative to the timing of the true peak). As shown in FIG. 15, the fractional delay available in each branch $g_m[n]$ of a polyphase interpolator can be exploited, in effect, to shift the timing of the samples relative to the timing of the true peak. By selecting the best branch filter, the timing of the "modified" peak sample is closer to the timing of the true peak, yielding a more accurate estimate of the timing of that particular signal path.

Figure 16:
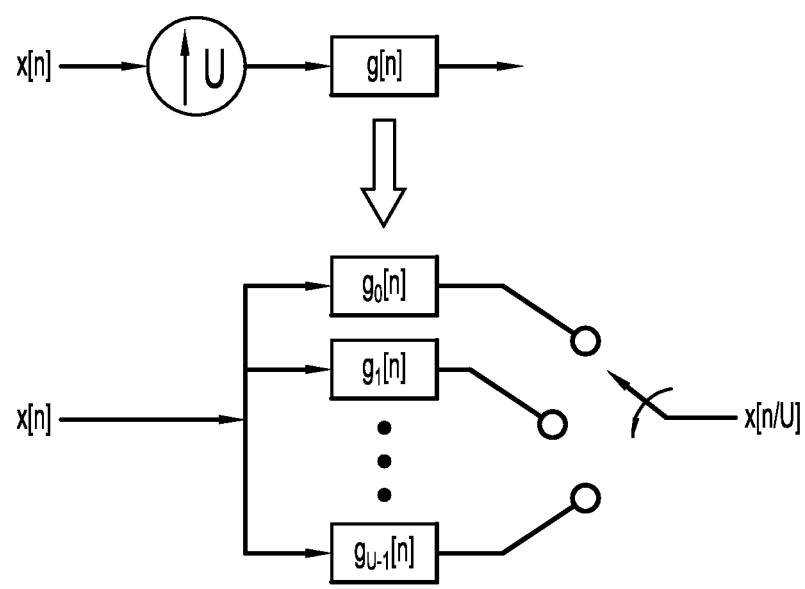
FIG. 16 is a block diagram illustrating implementation of a full polyphase interpolator.

To accomplish the desired system design, conceptually, a polyphase interpolator is designed that upsamples a signal x[n] by an integer value U, which is chosen such that, if the ADC sample rate were $UF_S$, the digital correlator would produce peaks with sufficient resolution to use directly without additional processing. FIG. 16 illustrates the principle of operation of a polyphase interpolator having U branch filters. An input signal x[n] is supplied in parallel to the U branch filters $g_0[n]$ through $g_{U-1}[n]$, and an output commutator cycles through the branch filter outputs to produce an upsampled output signal x[n/U]. However, in the technique described herein, only the one branch filter whose timing offset is closest to the peak timing offset $\epsilon_m$ is of interest for each peak. Consequently, the full upsampled output sequence is not necessary and therefore need not be generated, and the output commutator is not actually used.

The value of the peak timing offset $\epsilon_m$ obtained from the parabolic interpolation is used as an index to select the "best" branch filter $g_m[n]$ from among the U branch filters. This process is illustrated in connection with FIG. 17. As an example, let U=4, such that there are four branch filters for the polyphase interpolator: $g_0[n]$, $g_1[n]$, $g_2[n]$, and $g_3[n]$.

Figure 17:
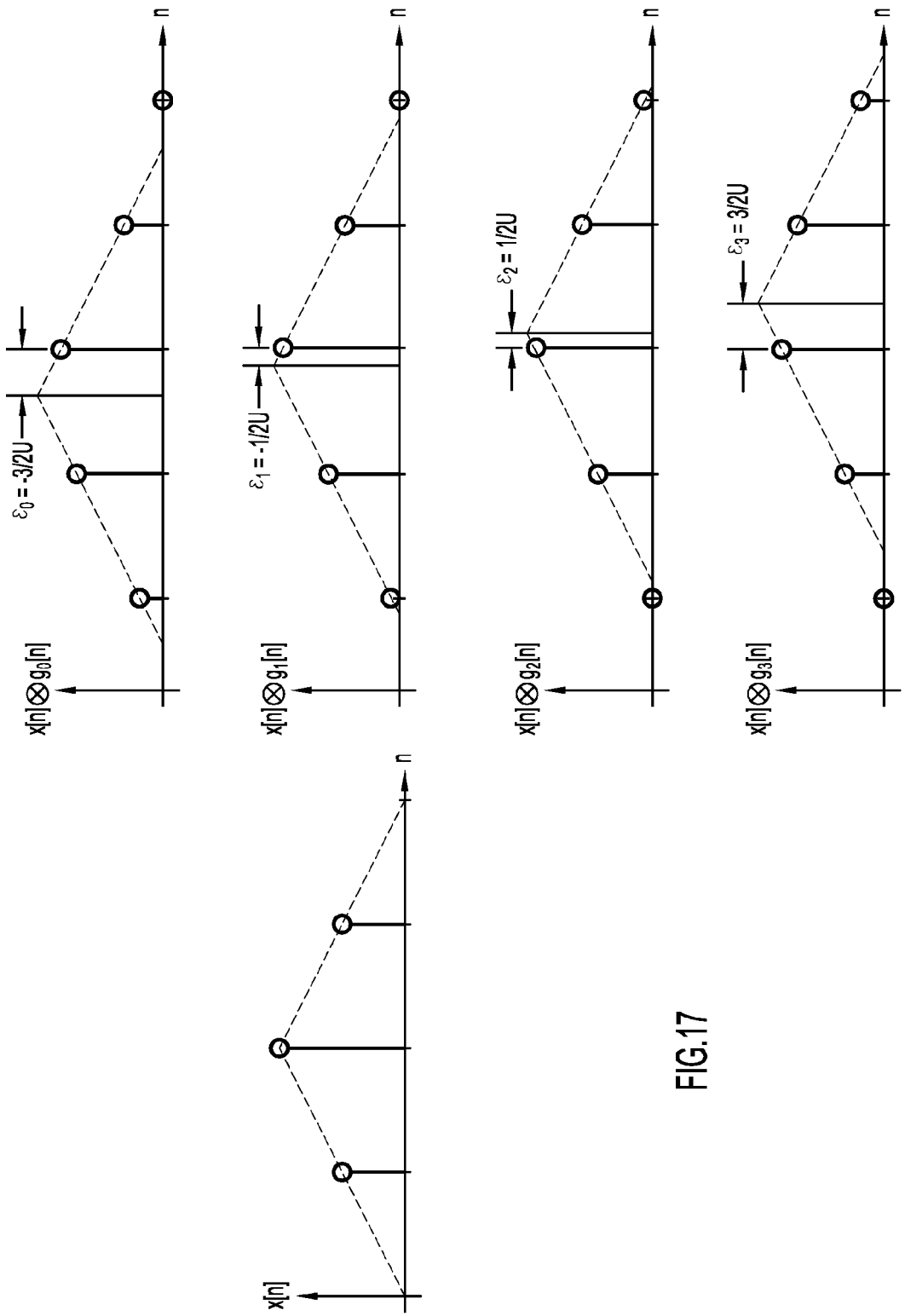
FIG. 17 is a set of graphs illustrating how different branch filters of a polyphase interpolator differently filter a correlation signal.

Filtering the input signal x[n] by each of the four branch filters respectively produces the four sample timing outputs shown on the right side of FIG. 17. For example, relative to the timing of the peak of the input signal x[n], the peak signal of the output of filter $g_0[n]$ (x[n]$\hat{\times}g_0[n]$) is located at $\epsilon_0$=−3/2U. Similarly, the peak signals of the output filters $g_1[n]$, $g_2[n]$, and $g_3[n]$ are respectively located at $\epsilon_1$=−1/2U, $\epsilon_2$=1/2U, and $\epsilon_3$=3/2U. For this specific example of U=4, the numerical values of $\epsilon_0$ through $\epsilon_3$ are then $\epsilon_0$=−0.375, $\epsilon_1$=−0.125, $\epsilon_2$=+0.125 and $\epsilon_3$=+0.375. If the peak timing offset $\epsilon_m$ computed from the parabolic interpolation was −0.1, branch filter $g_1[n]$ would be selected, since its timing offset of −0.125 is closest among the branch filters to the computed peak timing offset $\epsilon_m$. Similarly, if the peak timing offset $\epsilon_m$ computed from the parabolic interpolation was +0.4, branch filter $g_3[n]$ would be selected, since its timing offset of +0.375 is closest among the branch filters to the computed peak timing offset $\epsilon_m$. This process essentially results in a re-timing of the sampling to place the peak sample closer to the true peak for each peak in the correlation signal without actually increasing the sampling rate or performing any over sampling.

The true peak generated by parabolic interpolation can, in principle, be computed to have any value over a continuous range of values. The branch filter selected using this computed value as an index will still leave some residual peak timing error due to the remaining difference between the timing of the computed true peak and the fractional peak timing correction provided by the selected (closest) branch filter. However, this residual error is, on average, reduced by a factor of U relative to the average timing error in the original correlation signal, and this error reduction can be accomplished while requiring storage of only a limited number of filter coefficients.

Figure 18:
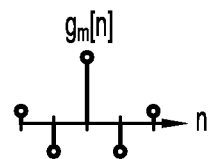
FIG. 18 is a graph showing an example of the coefficients of one branch filter of a polyphase interpolator.

Each branch filter of the polyphase interpolator has the same number of coefficients, but the coefficient values are different for each branch filter. As an example, for a polyphase interpolator whose branch filters have five coefficients, FIG. 18 shows the general form of the coefficients for an arbitrary branch filter $g_m[n]$. The coefficients in this example essentially take the form of a sequence of five values spaced according to the original sampling rate, with the sign and magnitude of the values being specific to the particular branch filter.

Figure 19:
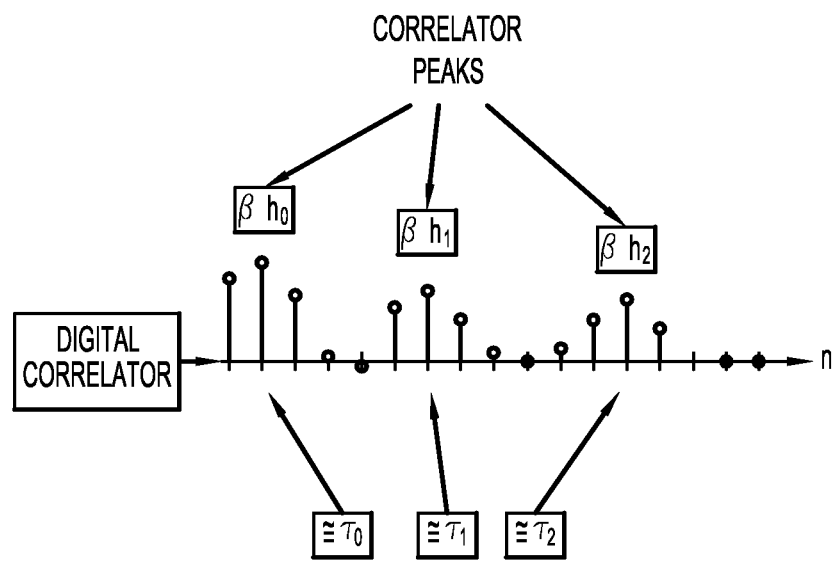
FIG. 19 is a graph highlighting the correlation peaks of a pilot correlation signal generated by a digital correlator.

For reference, a representative pilot correlation signal is shown again in FIG. 19. In this simplified example, the correlation signal includes a cluster of three peaks corresponding to reception of a signal over three different paths in a multipath channel, with each peak representing one of the signal paths of the channel. Specifically, the first peak corresponds to a scaled impulse response $\beta h_0$ of a first path occurring at a time $\tau_0$, the second peak corresponds to a scaled impulse response $\beta h_1$ of a second path occurring at a time $\tau_1$, and the third peak corresponds to a scaled impulse response $\beta h_2$ of a third path occurring at a time $\tau_2$. As previously explained, the timing of the peak sample in the correlation signal for each of these paths is accurate only to within about half of the sampling period of the true peak.

Figure 20:
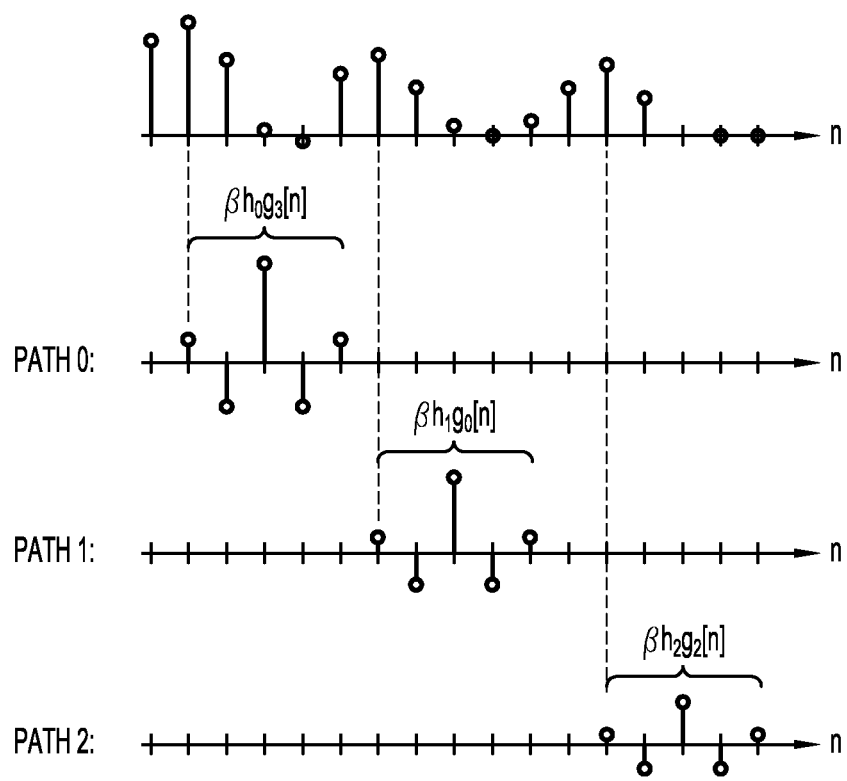
FIG. 20 is a set of graphs illustrating a technique for constructing a modified correlation signal from selected branch filter coefficients that are substituted for correlation peaks in the original pilot correlation signal.

FIG. 20 illustrates the process of constructing, path-by-path, a modified correlation signal from scaled replicas of filter coefficients of the selected branch filter for each of the three peaks (signal paths) of the example correlation signal shown in FIG. 19 in order to more accurately estimate the channel response. For each peak, the branch filter whose timing offset $\epsilon_i$ that most closely approximates the computed timing offset of the true peak $\epsilon_m$ is selected. In this arbitrary example, the branch filter $g_3[n]$ is selected for path 0 (the first peak) as the "best" branch filter, the branch filter $g_0[n]$ is selected for path 1 (the second peak), and the branch filter $g_2[n]$ is selected for path 2 (the third peak). Note that which branch filter is selected for each peak is based on the computed timing offset $\epsilon_m$ of the true peak relative to the timing of the peak sample in each case, such that selection of the closest branch filter for each peak is essentially independent of the branch filter selections for the other peaks in the correlation signal (e.g., it could have been the case that the same branch filter was selected for more than one path).

The branch filter coefficients selected for each signal path are scaled in magnitude in accordance with the amplitude of the associated correlation peak in the correlation signal. For example, the filter coefficients for branch filter $g_3[n]$ selected for path 0 are scaled by $\beta h_0$, the filter coefficients for branch filter $g_0[n]$ selected for path 1 are scaled by $\beta h_1$, and the filter coefficients for branch filter $g_2[n]$ selected for path 2 are scaled by $\beta h_2$. Further, to maintain the correct relative timing of the signal paths, the timing of the first coefficient for each selected branch filter (i.e., the timing of the first tap of the branch filter) is aligned in time with the timing of the corresponding peak sample in the original correlation signal, as shown in FIG. 20.

Figure 21:
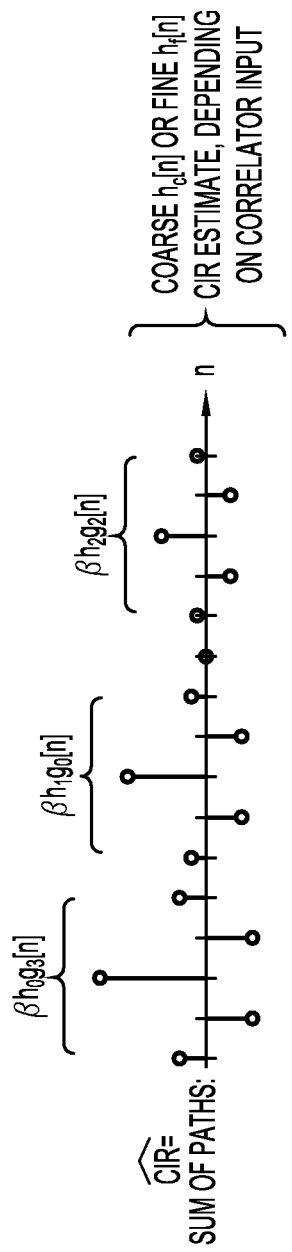
FIG. 21 is a graph illustrating the modified correlation signal generated by adding the selected branch filter coefficients.

FIG. 21 shows the complete estimate of the channel impulse response (i.e., the modified correlation signal providing the best estimate of the total multipath channel) resulting from adding the individual path responses shown in FIG. 20. There are no leading zeros in the CIR estimate (prior to the branch filter coefficients representing the first path. Depending on the timing of the peaks, if coefficients of two or more peaks coincide with the same sample period, the values of the coefficients are added to generate the value for that sample timing. In the example of five filter coefficients, if adjacent peaks are closer than five sample periods, at least one value in the modified correlation signal will result from the addition of coefficients from both adjacent peaks. Likewise, if the timing gap between adjacent peaks is greater than the extent of the filter coefficients, then zero values are inserted in between the sets of coefficients.

The technique for equalizing a distributed pilot OFDM signal described herein can be applied in a variety of commercial and military waveforms to achieve improved robustness in a high-Doppler environment. For example, the existing long term evolution (LTE) waveform and the existing soldier radio waveform (SRW) can be modified to include the equalization scheme as described herein. Due to its distributed nature, the described pilot signal has no significant identifying characteristic and is much less observable (stealthier) than the spectrum created by conventional pilot signals (e.g., the pilot signal of a standard WiFi signal (802.11) produces "rabbit ears" that are easily observable above the average noise power of the signal).

Having described example embodiments of a new and improved technique for equalization of a distributed pilot OFDM signal, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method comprising:
    at a receiver, coarsely correlating a received orthogonal frequency division multiplexed (OFDM) signal against a pilot reference to obtain a coarse channel estimate, the received OFDM signal comprising a distributed pilot signal and an OFDM data signal;
    coarsely equalizing the received OFDM signal based on the coarse channel estimate;
    removing the distributed pilot signal from the received OFDM signal after coarsely equalizing to generate a coarse data signal estimate;
    removing the coarse data signal estimate from the received OFDM signal using the coarse channel estimate to generate a residual pilot signal;
    finely correlating the residual pilot signal against the pilot reference to obtain a fine channel estimate;
    finely equalizing the received OFDM signal based on the fine channel estimate; and
    removing the distributed pilot signal from the received OFDM signal after fine equalization to generate a fine data signal estimate from which data is recoverable.

2. The method of claim 1, wherein coarsely equalizing the received OFDM signal based on the coarse channel estimate comprises:
    converting the received OFDM signal to a frequency domain signal;
    constructing a coarse zero forcing function from the coarse channel estimate; and
    applying the coarse zero forcing function to the frequency domain signal.

3. The method of claim 2, wherein removing the distributed pilot signal from the OFDM signal coarsely equalized based on the coarse channel estimate comprises removing the distributed pilot signal from the frequency domain signal after equalizing the received OFDM signal with the coarse zero forcing function.

4. The method of claim 2, wherein generating the coarse data signal estimate comprises performing data recovery on the received OFDM signal after equalization with the coarse zero forcing function and removal of the distributed pilot signal.

5. The method of claim 1, wherein removing the coarse data signal estimate from the received OFDM signal comprises:
    applying the coarse channel estimate to the coarse data signal estimate in the frequency domain to generate a coarse frequency domain representation of a received data signal;
    converting the coarse frequency domain representation of the received data signal to a coarse time domain representation of the received data signal; and
    subtracting the coarse time domain representation of the received data signal from the received OFDM signal in the time domain to generate the residual pilot signal.

6. The method of claim 1, wherein finely equalizing the received OFDM signal based on the fine channel estimate comprises:
    converting the received OFDM signal to a frequency domain signal;
    constructing a fine zero forcing function from the fine channel estimate; and
    applying the fine zero forcing function to the frequency domain signal.

7. The method of claim 6, wherein removing the distributed pilot signal from the OFDM signal finely equalized based on the fine channel estimate comprises removing the distributed pilot signal from the frequency domain signal after equalizing the received OFDM signal with the fine zero forcing function.

8. An apparatus comprising:
    a coarse correlator configured to correlate a received orthogonal frequency division multiplexed (OFDM) signal against a pilot reference to obtain a coarse channel estimate, the received OFDM signal comprising a distributed pilot signal and an OFDM data signal;
    a coarse equalizer configured to equalize the received OFDM signal based on the coarse channel estimate;
    a coarse pilot removal module configured to remove the distributed pilot signal from the received OFDM signal after coarse equalization;
    a data recovery module configured to perform data recovery on the received OFDM signal after coarse removal of the distributed pilot signal to produce a coarse data signal estimate;
    a data signal removal module configured to remove the coarse data signal estimate from the received OFDM signal using the coarse channel estimate to generate a residual pilot signal;
    a fine correlator configured to correlate the residual pilot signal against the pilot reference to obtain a fine channel estimate;
    a fine equalizer configured to equalize the received OFDM signal based on the fine channel estimate; and
    a fine pilot removal module configured to remove the distributed pilot signal from the received OFDM signal after fine equalization to generate a fine data signal estimate from which data is recoverable.

9. The apparatus of claim 8, wherein the coarse equalizer is further configured to: convert the received OFDM signal to a frequency domain signal;
    construct a coarse zero forcing function from the coarse channel estimate; and
    apply the coarse zero forcing function to the frequency domain signal to equalize the received OFDM signal.

10. The apparatus of claim 9, wherein the coarse pilot removal module is further configured to remove the distributed pilot signal from the frequency domain signal after coarse equalization of the received OFDM.

11. The apparatus of claim 8, wherein the data signal removal module is further configured to:
    apply the coarse channel estimate to the coarse data signal estimate in the frequency domain to generate a coarse frequency domain representation of a received data signal;

convert the coarse frequency domain representation of the received data signal to a coarse time domain representation of the received data signal; and subtract the coarse time domain representation of the received data signal from the received OFDM signal in the time domain to generate the residual pilot signal.

12. The apparatus of claim 8, wherein the fine equalizer is further configured to:

convert the received OFDM signal to a frequency domain signal;

construct a fine zero forcing function from the fine channel estimate; and apply the fine zero forcing function to the frequency domain signal to equalize the received OFDM signal.

13. The apparatus of claim 12, wherein the fine pilot removal module is further configured to remove the distributed pilot signal from the frequency domain signal after fine equalization of the received OFDM signal.

14. A non-transitory computer readable medium encoded with software comprising processor-executable instructions that, when executed by a processor, cause the processor to perform functions of:

coarsely correlating a received orthogonal frequency division multiplexed (OFDM) signal against a pilot reference to obtain a coarse channel estimate, the received OFDM signal comprising a distributed pilot signal and an OFDM data signal;

coarsely equalizing the received OFDM signal based on the coarse channel estimate;

removing the distributed pilot signal from the received OFDM signal after coarsely equalizing to generate a coarse data signal estimate;

removing the coarse data signal estimate from the received OFDM signal using the coarse channel estimate to generate a residual pilot signal;

finely correlating the residual pilot signal against the pilot reference to obtain a fine channel estimate;

finely equalizing the received OFDM signal based on the fine channel estimate; and removing the distributed pilot signal from the received OFDM signal after fine equalization to generate a fine data signal estimate from which data is recoverable.

15. The non-transitory computer readable medium of claim 14, wherein the instructions that cause the processor to coarsely equalize include instructions that cause the processor to perform the further functions of:

converting the received OFDM signal to a frequency domain signal;

constructing a coarse zero forcing function from the coarse channel estimate; and applying the coarse zero forcing function to the frequency domain signal.

16. The non-transitory computer readable medium of claim 15, wherein the instructions that cause the processor to remove the distributed pilot signal from the OFDM signal coarsely equalized include instructions that cause the processor to remove the distributed pilot signal from the frequency domain signal after equalizing the received OFDM signal with the coarse zero forcing function.

17. The non-transitory computer readable medium of claim 15, wherein the instructions that cause the processor to generate the coarse data signal estimate include instructions that cause the processor to perform data recovery on the received OFDM signal after equalization with the coarse zero forcing function and to remove of the distributed pilot signal.

18. The non-transitory computer readable medium of claim 14, wherein the instructions that cause the processor to remove the coarse data signal estimate from the received OFDM signal include instructions that cause the processor to perform the further functions of:

applying the coarse channel estimate to the coarse data signal estimate in the frequency domain to generate a coarse frequency domain representation of a received data signal;

converting the coarse frequency domain representation of the received data signal to a coarse time domain representation of the received data signal; and subtracting the coarse time domain representation of the received data signal from the received OFDM signal in the time domain to generate the residual pilot signal.

19. The non-transitory computer readable medium of claim 14, wherein the instructions that cause the processor to finely equalize the received OFDM signal include instructions that cause the processor to perform the further functions of:

converting the received OFDM signal to a frequency domain signal;

constructing a fine zero forcing function from the fine channel estimate; and applying the fine zero forcing function to the frequency domain signal.

20. The non-transitory computer readable medium of claim 19, wherein the instructions that cause the processor to remove the distributed pilot signal from the OFDM signal finely equalized based on the fine channel estimate include instructions that cause the processor to remove the distributed pilot signal from the frequency domain signal after equalizing the received OFDM signal with the fine zero forcing function.

* * * * *